United States Patent
Bui et al.

(10) Patent No.: US 10,529,370 B1
(45) Date of Patent: Jan. 7, 2020

(54) HUB COMPLIANCE LAYER FOR REDUCING MEDIA STRESS

(71) Applicant: International Business Machines Corporation, Armonk, NY (US)

(72) Inventors: Nhan X. Bui, Tucson, AZ (US); Ernest S. Gale, Tucson, AZ (US); Kevin B. Judd, Tucson, AZ (US); Richard A. West, Corona, AZ (US); Richard L. Bradshaw, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/017,783

(22) Filed: Jun. 25, 2018

(51) Int. Cl.
| | |
|---|---|
| *G11B 15/67* | (2006.01) |
| *G11B 5/008* | (2006.01) |
| *G11B 23/06* | (2006.01) |
| *G11B 23/107* | (2006.01) |
| *G11B 23/04* | (2006.01) |
| *G11B 23/087* | (2006.01) |
| *G11B 15/66* | (2006.01) |

(52) U.S. Cl.
CPC .......... *G11B 15/67* (2013.01); *G11B 5/00813* (2013.01); *G11B 15/66* (2013.01); *G11B 23/04* (2013.01); *G11B 23/06* (2013.01); *G11B 23/087* (2013.01); *G11B 23/107* (2013.01)

(58) Field of Classification Search
None
See application file for complete search history.

(56) References Cited

U.S. PATENT DOCUMENTS

| | | | |
|---|---|---|---|
| 3,550,872 A | 12/1970 | Porterfield | |
| 3,735,935 A | 5/1973 | Nordmeyer | |
| 4,052,020 A * | 10/1977 | Knox | B29C 45/1459 |
| | | | 242/608.8 |

(Continued)

FOREIGN PATENT DOCUMENTS

| | | | | |
|---|---|---|---|---|
| CA | 957997 A | * | 11/1974 | ........... B23B 31/404 |
| GB | 1020579 A | * | 2/1966 | ........... G11B 23/037 |

(Continued)

OTHER PUBLICATIONS

"Is Polyurethane Really Better Than Plastic or Rubber?" (Urethane Systems Plus, Inc. Posted on Feb. 7, 2013. https://urethanesp.wordpress.com/2013/02/07/is-polyurethane-really-better-than-plastic-or-rubber/ (Year: 2013).*

(Continued)

*Primary Examiner* — William J Klimowicz
(74) *Attorney, Agent, or Firm* — Zilka-Kotab, P.C.

(57) ABSTRACT

A product, according to one embodiment, includes: a tape spool having: a first flange, a second flange, and a circular hub sandwiched between the first and second flanges. The tape spool also includes a cylindrical compliance layer which encircles the hub. The compliance layer is configured to dampen radial stress exerted on the hub by a tape wound around the hub. A product, according to another embodiment, includes: a tape cartridge having: an outer housing, and a tape spool positioned within the outer housing. The tape spool further includes: a first flange, a circular hub coupled to the first flange, and a cylindrical compliance layer which encircles the hub. A magnetic tape is also wrapped around the compliance layer and the hub. Moreover, the compliance layer is configured to dampen radial stress exerted on inner wraps of the magnetic tape.

22 Claims, 16 Drawing Sheets

(56) References Cited

U.S. PATENT DOCUMENTS

| | | | |
|---|---|---|---|
| 4,184,650 A | 1/1980 | Nelson et al. | |
| 4,416,432 A * | 11/1983 | Komatsubara | G11B 15/22 242/334 |
| 4,626,950 A * | 12/1986 | Livermore | B65H 75/22 242/571 |
| 4,635,870 A | 1/1987 | Owens | |
| 6,719,242 B2 * | 4/2004 | Floyd, Jr. | B29C 63/18 242/609.4 |
| 7,338,002 B2 * | 3/2008 | Hamming | G11B 15/67 242/332.4 |
| 2005/0205707 A1 * | 9/2005 | Hanzlik | G11B 23/044 242/348 |

FOREIGN PATENT DOCUMENTS

| | | | | |
|---|---|---|---|---|
| GB | 1360918 A | * | 7/1974 | G11B 5/865 |
| JP | 04147480 A | * | 5/1992 | |
| JP | 05314717 A | * | 11/1993 | |
| JP | 05314719 A | * | 11/1993 | |
| JP | 08310735 A | * | 11/1996 | |
| JP | 2002025218 A | * | 1/2002 | |
| JP | 2002245740 A | * | 8/2002 | |
| WO | 8601928 A1 | | 3/1986 | |

OTHER PUBLICATIONS

Polyethylene Terephthalate Polyester (PET, PETP)—Properties and Applications—Supplier Data by Goodfellow. Written by AZoM. https://www.azom.com/article.aspx?ArticleID=2047 (Year: 2003).*

Williamson, M., "The 3480 Type Tape Cartridge: Potential Data Storage Risks, and Care and Handling Procedures to Minimize Risks," NIST Special Publication 500-199, Nov. 1991, 68 pages.

* cited by examiner

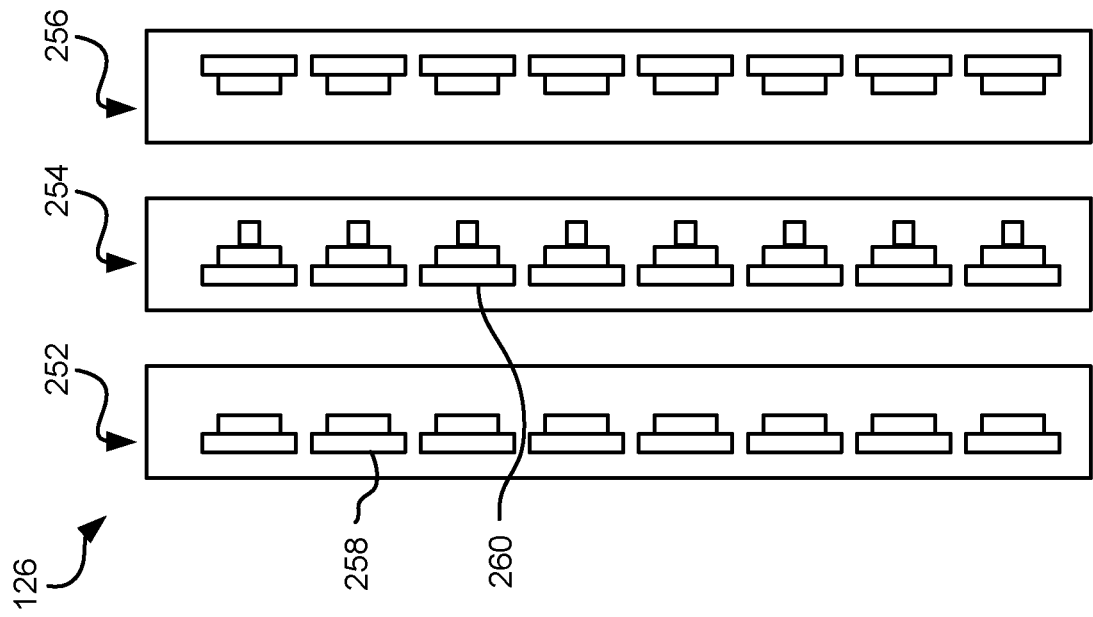
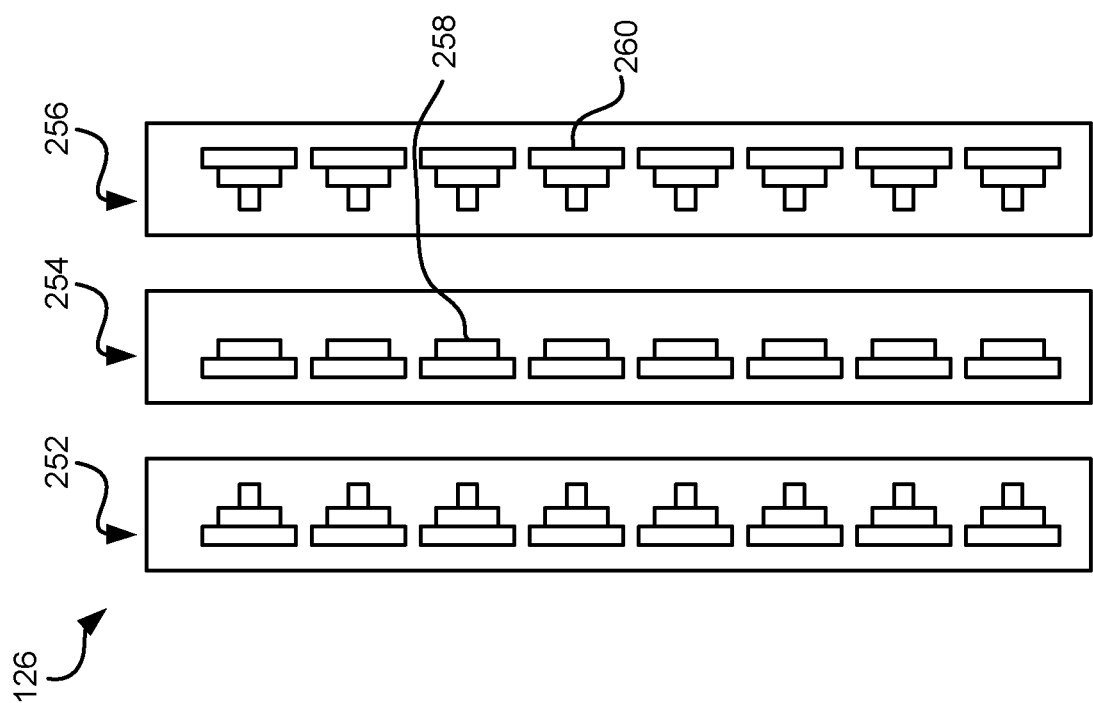

HUB COMPLIANCE LAYER FOR REDUCING MEDIA STRESS

BACKGROUND

The present invention relates to data storage systems, and more particularly, this invention relates to storage conditions for magnetic tape in data storage systems.

In magnetic storage systems, magnetic transducers read data from and write data onto magnetic recording media. Data is written on the magnetic recording media by moving a magnetic recording transducer to a position over the media where the data is to be stored. The magnetic recording transducer then generates a magnetic field, which encodes the data into the magnetic media. Data is read from the media by similarly positioning the magnetic read transducer and then sensing the magnetic field of the magnetic media. Read and write operations may be independently synchronized with the movement of the media to ensure that the data can be read from and written to the desired location on the media.

In a typical tape drive, multiple tracks are written to and/or read from a magnetic tape simultaneously. Moreover, data tracks on magnetic tapes are continually made smaller (in the cross-track direction) in an attempt to increase track density. However, as data tracks continue to become smaller, it becomes more difficult to ensure that data is written in the intended location on magnetic tape. This is particularly true for situations involving track misregistration which indicates a mismatch exists between the intended data track writing and/or reading location, and the actual data track writing and/or reading location.

Track misregistration can occur when the physical dimensions of a magnetic tape change between a time that data is written to the tape and a time that the data is read back from the tape. This dimensional instability may be caused by changes in temperature, humidity, or long term creep of the media caused by stresses exerted on the magnetic tape. For instance, when a magnetic tape is not in use, it is typically wrapped onto a tape spool for storage. Due to the length of magnetic tapes, numerous wraps of the magnetic tape are layered on top of each other, extending radially outward from the center of the tape spool. This process of winding the magnetic tape onto the spool causes a compressive stress to be imposed on the magnetic tape in the radial direction. In other words, each wrap of the magnetic tape exerts a compressive stress on the layers positioned therebelow.

Tape media is a viscoelastic material having both energy storage and energy dissipative mechanisms. Thus, the compressive stress experienced by a magnetic tape while wound on a spool may cause at least a portion of the tape to widen (deform) in the cross-track direction. However, after this compressive stress is applied to a magnetic tape, at least some of the dimensional deformation experienced by the tape will not be recoverable. This phenomenon is known as "creep". Tape creep may also be dependent on the temperature and humidity the magnetic tape is stored in, as hot and humid conditions tend to accelerate the creep process. Over time, creep may be sufficient enough to cause data tracks to be misaligned compared to the position that they were written in, thereby making it difficult or even impossible to read the data stored thereon in a single pass.

SUMMARY

A product, according to one embodiment, includes: a tape spool having: a first flange, a second flange, and a circular hub sandwiched between the first and second flanges. The tape spool also includes a cylindrical compliance layer which encircles the hub. The compliance layer is configured to dampen radial stress exerted on the hub by a tape wound around the hub.

By dampening the radial stress, the compliance layer in turn reduces the amount of compressive stress experienced by the various wraps of a magnetic tape which may be wrapped around the hub and compliance layer. Thus, the compliance layer may effectively serve as a cushioning (e.g., dampening) layer which surrounds the center hub of the product, and which is softer, less stiff, more compliant, etc., at least in comparison to the material characteristics of the center hub. The reduced amount of compressive stress experienced may also reduce the amount of tape creep experienced, particularly for portions of the magnetic tape wrapped closest to the hub (radially), even after being stored for long periods of time. Accordingly, introducing the compliance layer may significantly improve read performance, data access times, etc.

In some approaches, the material composition of the compliance layer may result in the ability of the compliance layer to dampen (e.g., reduce) radial stress. For instance, the compliance layer may include one or more materials which are able to undergo elastic deformation and/or change in volume when subjected to an applied external force. In other words, the compliance layer may be able to deform in order to effectively reduce the amount of radial compressive stress imposed by the various wraps of the magnetic tape when stored on the tape spool, and thereby reduce the amount of compressive stress experienced by wraps of the magnetic tape.

It is also greatly desired that a thickness of the compliance layer is constant along a circumference of the compliance layer, as any discontinuity in the thickness of the compliance layer itself and/or the point where the magnetic tape attaches thereto may lead to embossment which propagates from a central region of the tape reel to the outer wraps of tape stored thereon. This embossment may undesirably cause a shifted center of mass, vibrations during use in a tape drive, portions of the magnetic tape to protrude past the flanges thereby becoming exposed, etc. Thus, a uniform, constant thickness may desirably avoid any negative effects the compliance layer has on performance. A width of the compliance layer may also desirably be equal to a width of the hub as measured between the first and second flanges, thereby preventing any portions of a magnetic tape wound around the hub from coming into direct contact with the hub.

A product, according to another embodiment, includes: a tape cartridge having: an outer housing, and a tape spool positioned within the outer housing. The tape spool further includes: a first flange, a circular hub coupled to the first flange, and a cylindrical compliance layer which encircles the hub. A magnetic tape is also wrapped around the compliance layer and the hub. The compliance layer is configured to dampen radial stress exerted on inner wraps of the magnetic tape.

Again, by dampening the radial stress, the compliance layer in turn reduces the amount of compressive stress experienced by the various wraps of a magnetic tape which may be wrapped around the hub and compliance layer. Thus, the compliance layer may effectively serve as a cushioning (e.g., dampening) layer which surrounds the center hub of the product, and which is softer, less stiff, more compliant, etc., at least in comparison to the material characteristics of the center hub. The reduced amount of compressive stress experienced may also reduce the amount of tape creep experienced, particularly for portions of the magnetic tape wrapped closest to the hub (radially), even after being stored for long periods of time. Accordingly, introducing the compliance layer may significantly improve read performance, data access times, etc.

In some approaches, the material composition of the compliance layer may result in the ability of the compliance layer to dampen (e.g., reduce) radial stress. For instance, the compliance layer may include one or more materials which are able to undergo elastic deformation and/or change in volume when subjected to an applied external force. In other words, the compliance layer may be able to deform in order to effectively reduce the amount of radial compressive stress imposed by the various wraps of the magnetic tape when stored on the tape spool, and thereby reduce the amount of compressive stress experienced by wraps of the magnetic tape.

It is also greatly desired that a thickness of the compliance layer is constant along a circumference of the compliance layer, as any discontinuity in the thickness of the compliance layer itself and/or the point where the magnetic tape attaches thereto may lead to embossment which propagates from a central region of the tape reel to the outer wraps of tape stored thereon. This embossment may undesirably cause a shifted center of mass, vibrations during use in a tape drive, portions of the magnetic tape to protrude past the flanges thereby becoming exposed, etc. Thus, a uniform, constant thickness may desirably avoid any negative effects the compliance layer has on performance. A width of the compliance layer may also desirably be equal to a width of the hub as measured between the first and second flanges, thereby preventing any portions of a magnetic tape wound around the hub from coming into direct contact with the hub.

A product, according to yet another embodiment, includes: a tape spool having: a first flange; a circular hub coupled to the first flange; and a cylindrical compliance layer encircling the hub. The compliance layer is configured to dampen radial stress exerted on the hub by a tape wound around the hub.

Dampening the radial stress allows for the compliance layer to, in turn, reduce the amount of compressive stress experienced by the various wraps of a magnetic tape which may be wrapped around the hub and compliance layer. Thus, the compliance layer may effectively serve as a cushioning (e.g., dampening) layer which surrounds the center hub of the product, and which is softer, less stiff, more compliant, etc., at least in comparison to the material characteristics of the center hub. The reduced amount of compressive stress experienced may also reduce the amount of tape creep experienced, particularly for portions of the magnetic tape wrapped closest to the hub (radially), even after being stored for long periods of time. Accordingly, introducing the compliance layer may significantly improve read performance, data access times, etc.

It is also greatly desired that a thickness of the compliance layer is constant along a circumference of the compliance layer, as any discontinuity in the thickness of the compliance layer itself and/or the point where the magnetic tape attaches thereto may lead to embossment which propagates from a central region of the tape reel to the outer wraps of tape stored thereon. This embossment may undesirably cause a shifted center of mass, vibrations during use in a tape drive, portions of the magnetic tape to protrude past the flanges thereby becoming exposed, etc. Thus, a uniform, constant thickness may desirably avoid any negative effects the compliance layer has on performance. A width of the compliance layer may also desirably be equal to a width of the hub as measured between the first and second flanges, thereby preventing any portions of a magnetic tape wound around the hub from coming into direct contact with the hub.

Any of these embodiments may be implemented in a magnetic data storage system such as a tape drive system, which may include a magnetic head, a drive mechanism for passing a magnetic medium (e.g., recording tape) over the magnetic head, and a controller electrically coupled to the magnetic head.

Other aspects and embodiments of the present invention will become apparent from the following detailed description, which, when taken in conjunction with the drawings, illustrate by way of example the principles of the invention.

BRIEF DESCRIPTION OF THE DRAWINGS

FIG. 3 is a partial tape bearing surface view of a magnetic head having a write-read-write configuration.

FIG. 4 is a partial tape bearing surface view of a magnetic head having a read-write-read configuration.

DETAILED DESCRIPTION

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified.

The following description discloses several preferred embodiments of magnetic storage systems which significantly reduce the amount of tape creep experienced, even after long periods of storage, as well as operation and/or component parts thereof. By reducing the amount of creep experienced by a magnetic tape, track misregistration may be greatly reduced, thereby improving read performance by reducing the bit error rate experienced while reading magnetic tape which has been stored on a tape spool, reducing data access times, increasing achievable system throughput, etc., as will be described in further detail below.

In one general embodiment, a product includes: a tape spool having: a first flange, a second flange, and a circular hub sandwiched between the first and second flanges. The tape spool also includes a cylindrical compliance layer which encircles the hub. The compliance layer is configured to dampen radial stress exerted on the hub by a tape wound around the hub.

In another general embodiment, a product includes: a tape cartridge having: an outer housing, and a tape spool positioned within the outer housing. The tape spool further includes: a first flange, a circular hub coupled to the first flange, and a cylindrical compliance layer which encircles the hub. A magnetic tape is also wrapped around the compliance layer and the hub. The compliance layer is configured to dampen radial stress exerted on inner wraps of the magnetic tape.

In yet another general embodiment, a product includes: a tape spool having: a first flange; a circular hub coupled to the first flange; and a cylindrical compliance layer encircling the hub. The compliance layer is configured to dampen radial stress exerted on the hub by a tape wound around the hub.

Figure 1A:
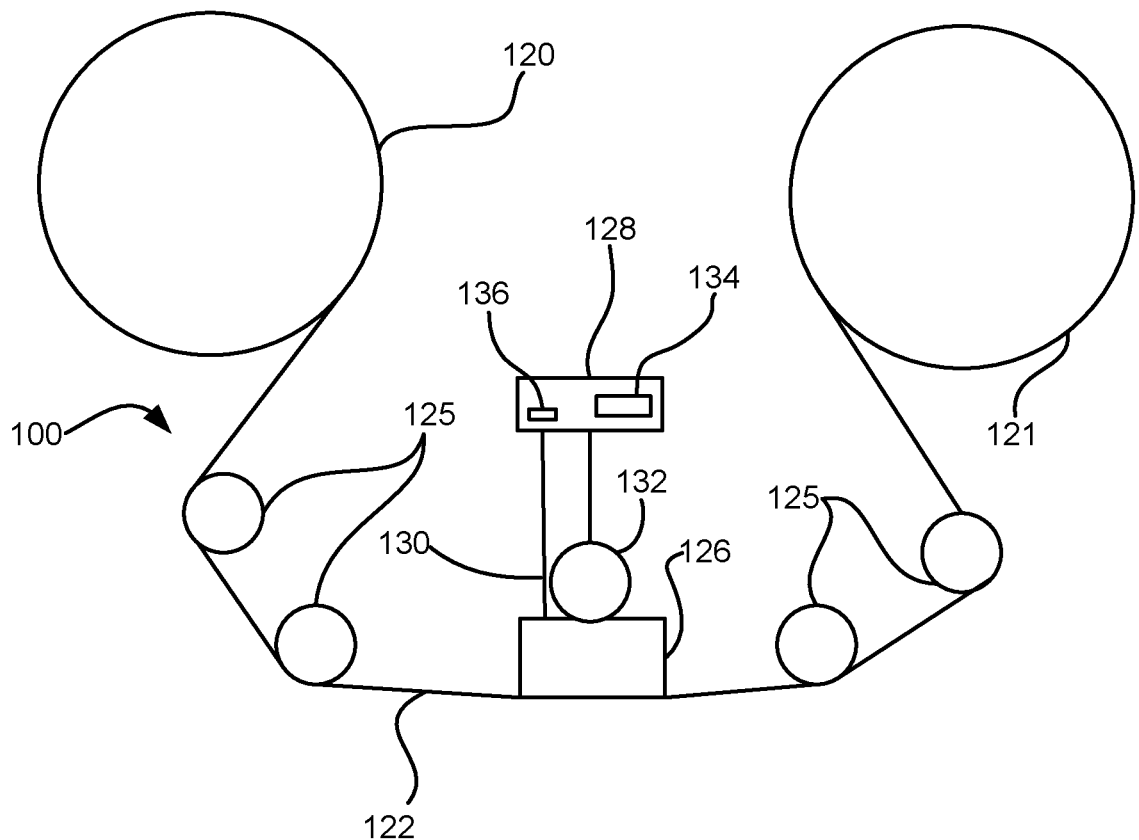
FIG. 1A is a schematic diagram of a simplified tape drive system according to one embodiment.

FIG. 1A illustrates a simplified tape drive 100 of a tape-based data storage system, which may be employed in the context of the present invention. While one specific implementation of a tape drive is shown in FIG. 1A, it should be noted that the various approaches described herein may be implemented in the context of any type of tape drive system.

As shown, a tape supply cartridge 120 and a take-up reel 121 are provided to support a tape 122. One or more of the reels may form part of a removable cartridge and are not necessarily part of the tape drive 100. The tape drive, such as that illustrated in FIG. 1A, may further include drive motor(s) to drive the tape supply cartridge 120 and the take-up reel 121 to move the tape 122 over a tape head 126 of any type. Such head may include an array of readers, writers, or both.

Guides 125 guide the tape 122 across the tape head 126. Such tape head 126 is in turn coupled to a controller 128 via a cable 130. The controller 128, may be or include a processor and/or any logic for controlling any subsystem of the drive 100. For example, the controller 128 typically controls head functions such as servo following, data writing, data reading, etc. The controller 128 may include at least one servo channel and at least one data channel, each of which include data flow processing logic configured to process and/or store information to be written to and/or read from the tape 122. The controller 128 may operate under logic known in the art, as well as any logic disclosed herein, and thus may be considered as a processor for any of the descriptions of tape drives included herein, in various approaches. The controller 128 may be coupled to a memory 136 of any known type, which may store instructions executable by the controller 128. Moreover, the controller 128 may be configured and/or programmable to perform or control some or all of the methodology presented herein. Thus, the controller 128 may be considered to be configured to perform various operations by way of logic programmed into one or more chips, modules, and/or blocks; software, firmware, and/or other instructions being available to one or more processors; etc., and combinations thereof.

The cable 130 may include read/write circuits to transmit data to the head 126 to be recorded on the tape 122 and to receive data read by the head 126 from the tape 122. An actuator 132 controls position of the head 126 relative to the tape 122.

An interface 134 may also be provided for communication between the tape drive 100 and a host (internal or external) to send and receive the data and for controlling the operation of the tape drive 100 and communicating the status of the tape drive 100 to the host, all as will be understood by those of skill in the art.

Figure 1B:
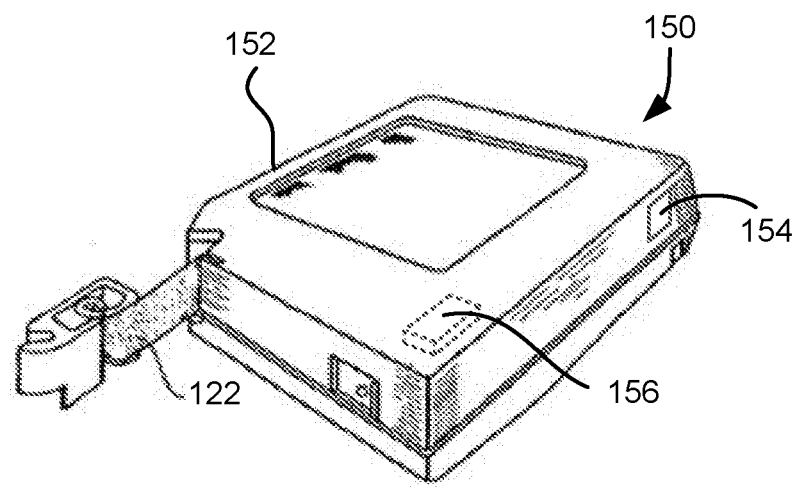
FIG. 1B is a schematic diagram of a tape cartridge according to one embodiment.

FIG. 1B illustrates an exemplary tape cartridge 150 according to one embodiment. Such tape cartridge 150 may be used with a system such as that shown in FIG. 1A. As shown, the tape cartridge 150 includes a housing 152, a tape 122 in the housing 152, and a nonvolatile memory 156 coupled to the housing 152. In some approaches, the nonvolatile memory 156 may be embedded inside the housing 152, as shown in FIG. 1B. In more approaches, the nonvolatile memory 156 may be attached to the inside or outside of the housing 152 without modification of the housing 152. For example, the nonvolatile memory may be embedded in a self-adhesive label 154. In one preferred approach, the nonvolatile memory 156 may be a Flash memory device, read-only memory (ROM) device, etc., embedded into or coupled to the inside or outside of the tape cartridge 150. The nonvolatile memory is accessible by the tape drive and the tape operating software (the driver software), and/or another device.

Figure 2A:
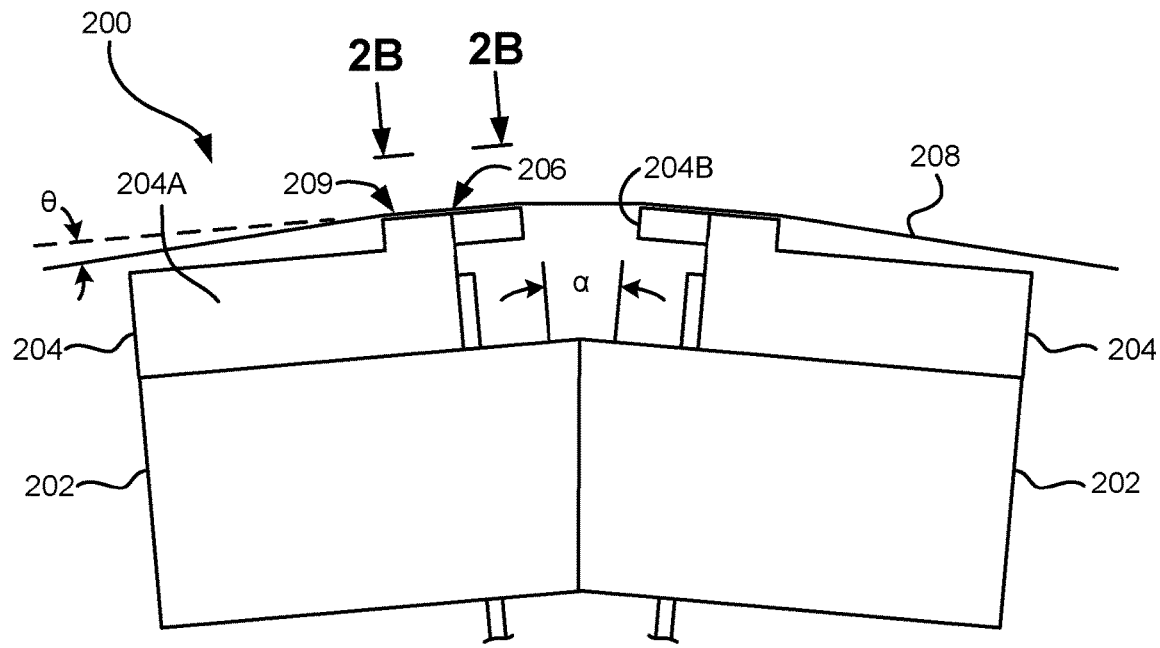
FIG. 2A is a side view of a flat-lapped, bi-directional, two-module magnetic tape head according to one embodiment.

By way of example, FIG. 2A illustrates a side view of a flat-lapped, bi-directional, two-module magnetic tape head 200 which may be implemented in the context of the present invention. As shown, the head includes a pair of bases 202, each equipped with a module 204, and fixed at a small angle α with respect to each other. The bases may be "U-beams" that are adhesively coupled together. Each module 204 includes a substrate 204A and a closure 204B with a thin film portion, commonly referred to as a "gap" in which the readers and/or writers 206 are formed. In use, a tape 208 is moved over the modules 204 along a media (tape) bearing surface 209 in the manner shown for reading and writing data on the tape 208 using the readers and writers. The wrap angle θ of the tape 208 at edges going onto and exiting the flat media support surfaces 209 are usually between about 0.1 degree and about 3 degrees.

The substrates 204A are typically constructed of a wear resistant material, such as a ceramic. The closures 204B may be made of the same or similar ceramic as the substrates 204A.

The readers and writers may be arranged in a piggyback or merged configuration. An illustrative piggybacked configuration comprises a (magnetically inductive) writer transducer on top of (or below) a (magnetically shielded) reader transducer (e.g., a magnetoresistive reader, etc.), wherein the poles of the writer and the shields of the reader are generally separated. An illustrative merged configuration comprises one reader shield in the same physical layer as one writer pole (hence, "merged"). The readers and writers may also be arranged in an interleaved configuration. Alternatively, each array of channels may be readers or writers only. Any of these arrays may contain one or more servo track readers for reading servo data on the medium.

Figure 2B:
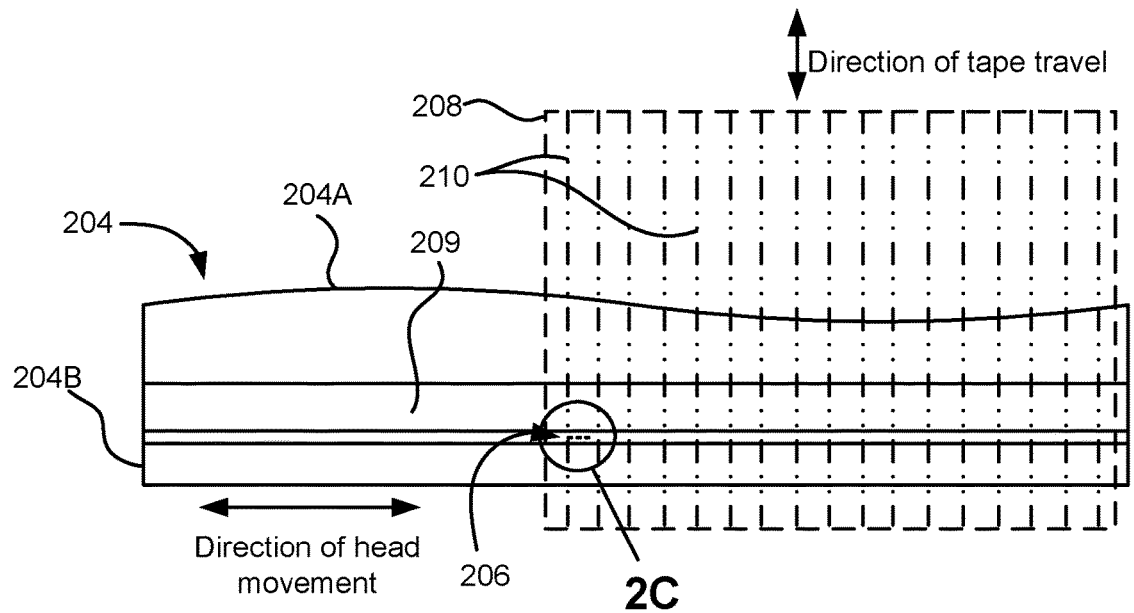
FIG. 2B is a tape bearing surface view taken from Line 2B of FIG. 2A.

FIG. 2B illustrates the tape bearing surface 209 of one of the modules 204 taken from Line 2B of FIG. 2A. A representative tape 208 is shown in dashed lines. The module 204 is preferably long enough to be able to support the tape as the head steps between data bands.

In this example, the tape 208 includes 4 to 32 data bands, e.g., with 16 data bands and 17 servo tracks 210, as shown in FIG. 2B on a one-half inch wide tape 208. The data bands are defined between servo tracks 210. Each data band may include a number of data tracks, for example 1024 data tracks (not shown). During read/write operations, the readers and/or writers 206 are positioned to specific track positions within one of the data bands. Outer readers, sometimes called servo readers, read the servo tracks 210. The servo signals are in turn used to keep the readers and/or writers 206 aligned with a particular set of tracks during the read/write operations.

Figure 2C:
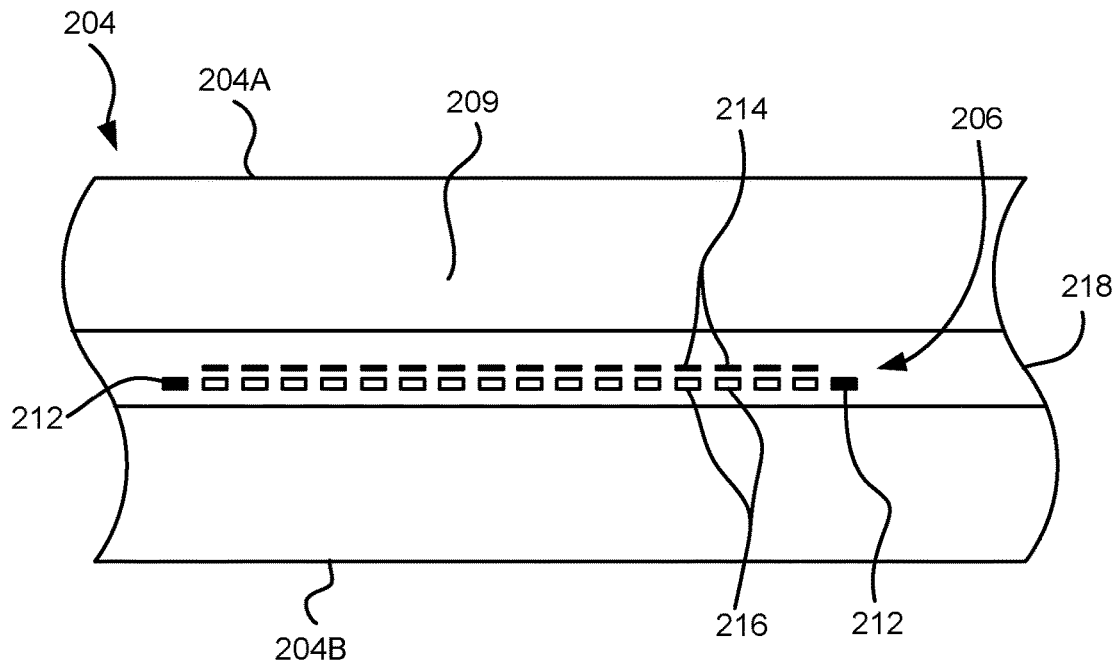
FIG. 2C is a detailed view taken from Circle 2C of FIG. 2B.

FIG. 2C depicts a plurality of readers and/or writers 206 formed in a gap 218 on the module 204 in Circle 2C of FIG. 2B. As shown, the array of readers and writers 206 includes, for example, 16 writers 214, 16 readers 216 and two servo readers 212, though the number of elements may vary. Illustrative approaches include 8, 16, 32, 40, and 64 active readers and/or writers 206 per array, and alternatively interleaved designs having odd numbers of reader or writers such as 17, 25, 33, etc. An illustrative approach includes 32 readers per array and/or 32 writers per array, where the actual number of transducer elements could be greater, e.g., 33, 34, etc. This allows the tape to travel more slowly, thereby reducing speed-induced tracking and mechanical difficulties and/or execute fewer "wraps" to fill or read the tape. While the readers and writers may be arranged in a piggyback configuration as shown in FIG. 2C, the readers 216 and writers 214 may also be arranged in an interleaved configuration. Alternatively, each array of readers and/or writers 206 may be readers or writers only, and the arrays may contain one or more servo readers 212. As noted by considering FIGS. 2A and 2B-2C together, each module 204 may include a complementary set of readers and/or writers 206 for such things as bi-directional reading and writing, read-while-write capability, backward compatibility, etc.

Figure 2D:
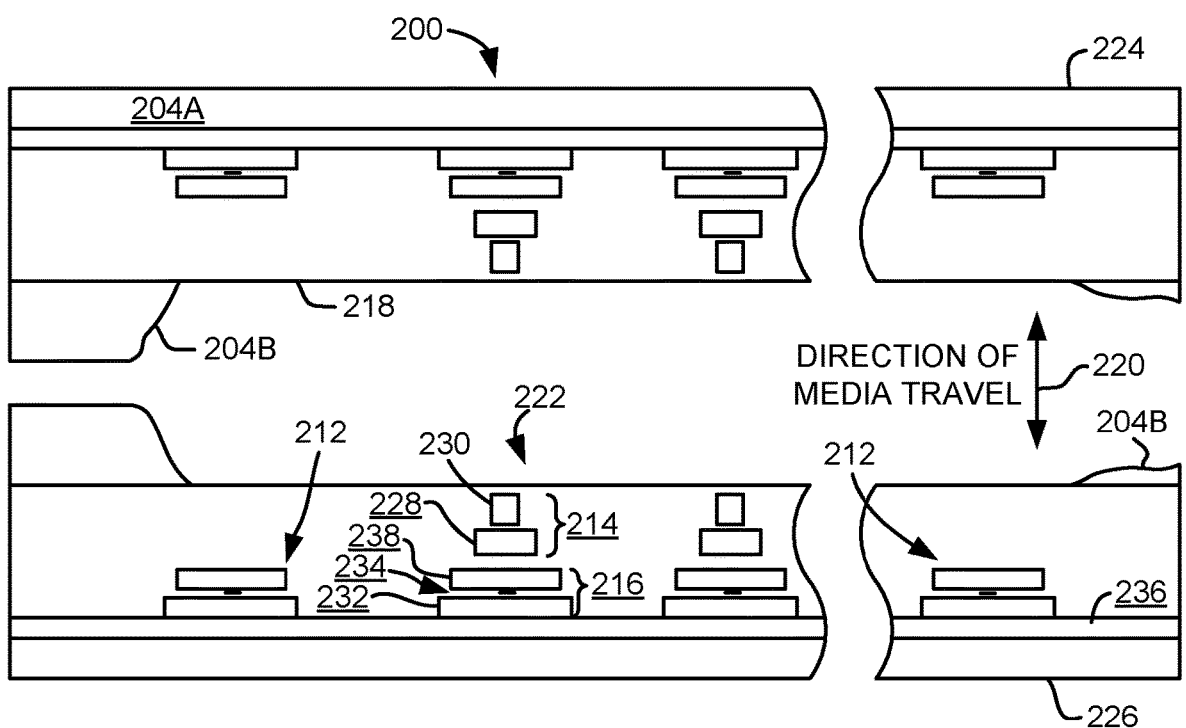
FIG. 2D is a detailed view of a partial tape bearing surface of a pair of modules.

FIG. 2D shows a partial tape bearing surface view of complementary modules of a magnetic tape head 200 according to one embodiment. In this embodiment, each module has a plurality of read/write (R/W) pairs in a piggyback configuration formed on a common substrate 204A and an optional electrically insulative layer 236. The writers, exemplified by the write transducer 214 and the readers, exemplified by the read transducer 216, are aligned parallel to an intended direction of travel of a tape medium thereacross to form an R/W pair, exemplified by the R/W pair 222. Note that the intended direction of tape travel is sometimes referred to herein as the direction of tape travel, and such terms may be used interchangeably. Such direction of tape travel may be inferred from the design of the system, e.g., by examining the guides; observing the actual direction of tape travel relative to the reference point; etc. Moreover, in a system operable for bi-direction reading and/or writing, the direction of tape travel in both directions is typically parallel and thus both directions may be considered equivalent to each other.

Several R/W pairs 222 may be present, such as 8, 16, 32 pairs, etc. The R/W pairs 222 as shown are linearly aligned in a direction generally perpendicular to a direction of tape travel thereacross. However, the pairs may also be aligned diagonally, etc. Servo readers 212 are positioned on the outside of the array of R/W pairs, the function of which is well known.

Generally, the magnetic tape medium moves in either a forward or reverse direction as indicated by arrow 220. The magnetic tape medium and head assembly 200 operate in a transducing relationship in the manner well-known in the art. The piggybacked magnetoresistive (MR) head assembly 200 includes two thin-film modules 224 and 226 of generally identical construction.

Modules 224 and 226 are joined together with a space present between closures 204B thereof (partially shown) to form a single physical unit to provide read-while-write capability by activating the writer of the leading module and reader of the trailing module aligned with the writer of the leading module parallel to the direction of tape travel relative thereto. When a module 224, 226 of a piggyback head 200 is constructed, layers are formed in the gap 218 created above an electrically conductive substrate 204A (partially shown), e.g., of AlTiC, in generally the following order for the R/W pairs 222: an insulating layer 236, a first shield 232 typically of an iron alloy such as NiFe (−), cobalt zirconium tantalum (CZT) or Al—Fe—Si (Sendust), a sensor 234 for sensing a data track on a magnetic medium, a second shield 238 typically of a nickel-iron alloy (e.g., ~80/20 at % NiFe, also known as permalloy), first and second writer pole tips 228, 230, and a coil (not shown). The sensor may be of any known type, including those based on MR, GMR, AMR, tunneling magnetoresistance (TMR), etc.

The first and second writer poles 228, 230 may be fabricated from high magnetic moment materials such as ~45/55 NiFe. Note that these materials are provided by way of example only, and other materials may be used. Additional layers such as insulation between the shields and/or pole tips and an insulation layer surrounding the sensor may be present. Illustrative materials for the insulation include alumina and other oxides, insulative polymers, etc.

The configuration of the tape head 126 according to one approach includes multiple modules, preferably three or more. In a write-read-write (W-R-W) head, outer modules for writing flank one or more inner modules for reading. Referring to FIG. 3, depicting a W-R-W configuration, the outer modules 252, 256 each include one or more arrays of writers 260. The inner module 254 of FIG. 3 includes one or more arrays of readers 258 in a similar configuration. Variations of a multi-module head include a R-W-R head (FIG. 4), a R-R-W head, a W-W-R head, etc. In yet other variations, one or more of the modules may have read/write pairs of transducers. Moreover, more than three modules may be present. In further approaches, two outer modules may flank two or more inner modules, e.g., in a W-R-R-W, a R-W-W-R arrangement, etc. For simplicity, a W-R-W head is used primarily herein to exemplify approaches of the present invention. One skilled in the art apprised with the teachings herein will appreciate how permutations of the present invention would apply to configurations other than a W-R-W configuration.

Figure 5:
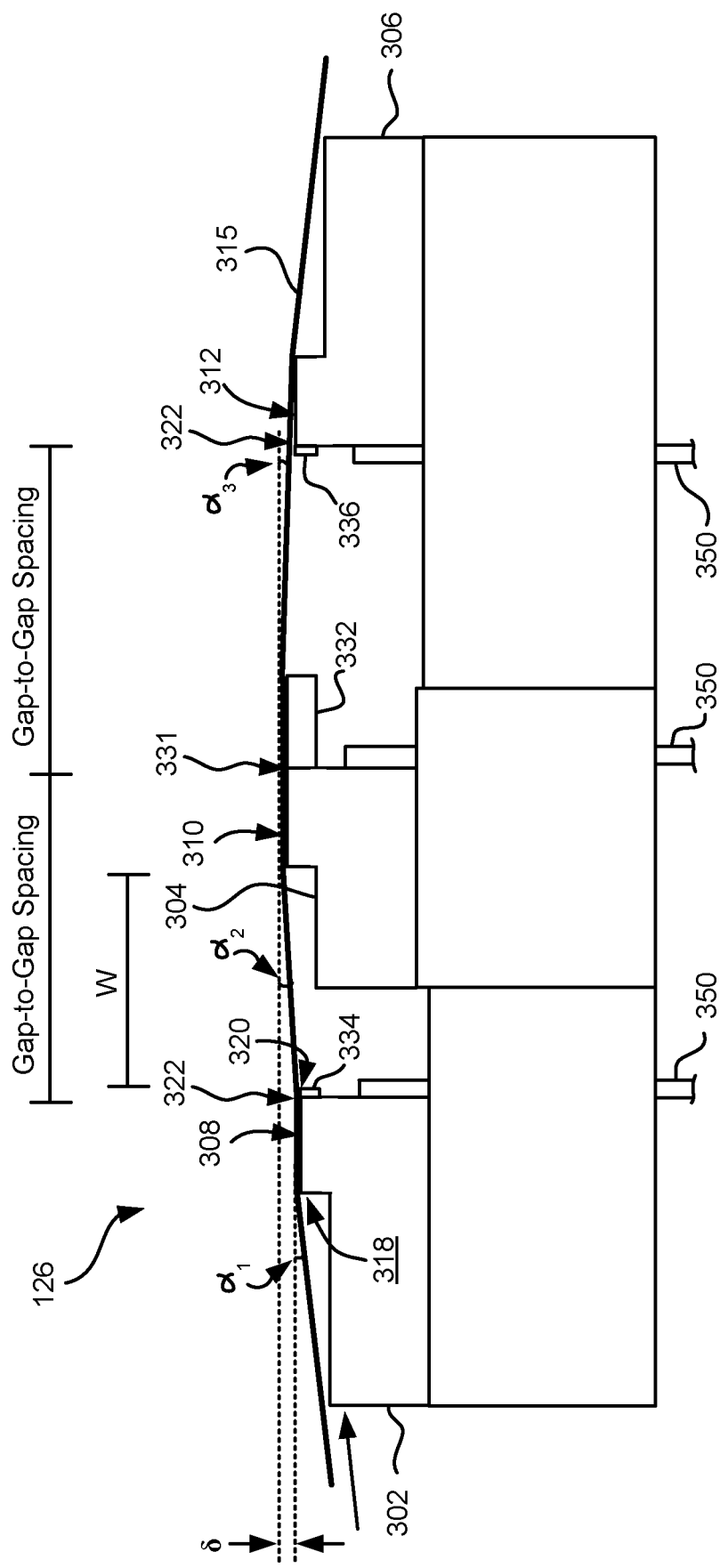
FIG. 5 is a side view of a magnetic tape head with three modules according to one embodiment where the modules all generally lie along about parallel planes.

FIG. 5 illustrates a magnetic head 126 according to one embodiment of the present invention that includes first, second and third modules 302, 304, 306 each having a tape bearing surface 308, 310, 312 respectively, which may be flat, contoured, etc. Note that while the term "tape bearing surface" appears to imply that the surface facing the tape 315 is in physical contact with the tape bearing surface, this is not necessarily the case. Rather, only a portion of the tape may be in contact with the tape bearing surface, constantly or intermittently, with other portions of the tape riding (or "flying") above the tape bearing surface on a layer of air, sometimes referred to as an "air bearing". The first module 302 will be referred to as the "leading" module as it is the first module encountered by the tape in a three module design for tape moving in the indicated direction. The third module 306 will be referred to as the "trailing" module. The trailing module follows the middle module and is the last module seen by the tape in a three module design. The leading and trailing modules 302, 306 are referred to collectively as outer modules. Also note that the outer modules 302, 306 will alternate as leading modules, depending on the direction of travel of the tape 315.

Figure 6:
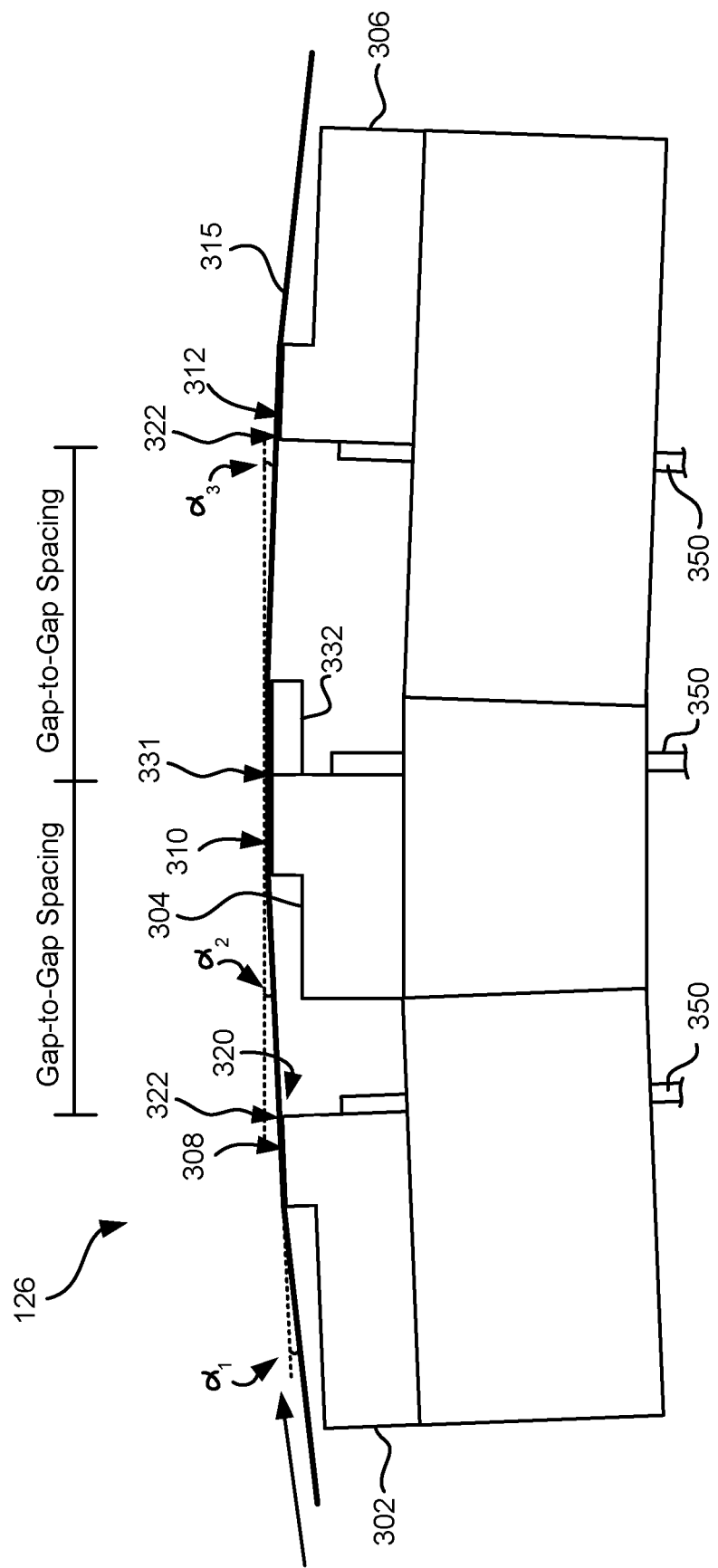
FIG. 6 is a side view of a magnetic tape head with three modules in a tangent (angled) configuration.

In one approach, the tape bearing surfaces 308, 310, 312 of the first, second and third modules 302, 304, 306 lie on about parallel planes (which is meant to include parallel and nearly parallel planes, e.g., between parallel and tangential as in FIG. 6), and the tape bearing surface 310 of the second module 304 is above the tape bearing surfaces 308, 312 of the first and third modules 302, 306. As described below, this has the effect of creating the desired wrap angle $\alpha_2$ of the tape relative to the tape bearing surface 310 of the second module 304.

Where the tape bearing surfaces 308, 310, 312 lie along parallel or nearly parallel yet offset planes, intuitively, the tape should peel off of the tape bearing surface 308 of the leading module 302. However, the vacuum created by the skiving edge 318 of the leading module 302 has been found by experimentation to be sufficient to keep the tape adhered to the tape bearing surface 308 of the leading module 302. The trailing edge 320 of the leading module 302 (the end from which the tape leaves the leading module 302) is the approximate reference point which defines the wrap angle $\alpha_2$ over the tape bearing surface 310 of the second module 304. The tape stays in close proximity to the tape bearing surface until close to the trailing edge 320 of the leading module 302. Accordingly, read and/or write elements 322 may be located near the trailing edges of the outer modules 302, 306. These approaches are particularly adapted for write-read-write applications.

A benefit of this and other approaches described herein is that, because the outer modules 302, 306 are fixed at a determined offset from the second module 304, the inner wrap angle $\alpha_2$ is fixed when the modules 302, 304, 306 are coupled together or are otherwise fixed into a head. The inner wrap angle $\alpha_2$ is approximately $\tan^{-1}(\delta/W)$ where $\delta$ is the height difference between the planes of the tape bearing surfaces 308, 310 and W is the width between the opposing ends of the tape bearing surfaces 308, 310. An illustrative inner wrap angle $\alpha_2$ is in a range of about 0.3° to about 1.1°, though can be any angle corresponding to the given design.

Beneficially, the inner wrap angle $\alpha_2$ on the side of the module 304 receiving the tape (leading edge) will be larger than the inner wrap angle $\alpha_3$ on the trailing edge, as the tape 315 rides above the trailing module 306. This difference is generally beneficial as a smaller $\alpha_3$ tends to oppose what has heretofore been a steeper exiting effective wrap angle.

Note that the tape bearing surfaces 308, 312 of the outer modules 302, 306 are positioned to achieve a negative wrap angle at the trailing edge 320 of the leading module 302. This is generally beneficial in helping to reduce friction due to contact with the trailing edge 320, provided that proper consideration is given to the location of the crowbar region that forms in the tape where it peels off the head. This negative wrap angle also reduces flutter and scrubbing damage to the elements on the leading module 302. Further, at the trailing module 306, the tape 315 flies over the tape bearing surface 312 so there is virtually no wear on the elements when tape is moving in this direction. Particularly, the tape 315 entrains air and so will not significantly ride on the tape bearing surface 312 of the third module 306 (some contact may occur). This is permissible, because the leading module 302 is writing while the trailing module 306 is idle.

Writing and reading functions are performed by different modules at any given time. In one approach, the second module 304 includes a plurality of data and optional servo readers 331 and no writers. The first and third modules 302, 306 include a plurality of writers 322 and no data readers, with the exception that the outer modules 302, 306 may include optional servo readers. The servo readers may be used to position the head during reading and/or writing operations. The servo reader(s) on each module are typically located towards the end of the array of readers or writers.

By having only readers or side by side writers and servo readers in the gap between the substrate and closure, the gap length can be substantially reduced. Typical heads have piggybacked readers and writers, where the writer is formed above each reader. A typical gap is 20-35 microns. However, irregularities on the tape may tend to droop into the gap and create gap erosion. Thus, the smaller the gap is the better. The smaller gap enabled herein exhibits fewer wear related problems.

In some approaches, the second module 304 has a closure, while the first and third modules 302, 306 do not have a closure. Where there is no closure, preferably a hard coating is added to the module. One preferred coating is diamond-like carbon (DLC).

In the embodiment shown in FIG. 5, the first, second, and third modules 302, 304, 306 each have a closure 332, 334, 336, which extends the tape bearing surface of the associated module, thereby effectively positioning the read/write elements away from the edge of the tape bearing surface. The closure 332 on the second module 304 can be a ceramic closure of a type typically found on tape heads. The closures 334, 336 of the first and third modules 302, 306, however, may be shorter than the closure 332 of the second module 304 as measured parallel to a direction of tape travel over the respective module. This enables positioning the modules closer together. One way to produce shorter closures 334, 336 is to lap the standard ceramic closures of the second module 304 an additional amount. Another way is to plate or deposit thin film closures above the elements during thin film processing. For example, a thin film closure of a hard material such as Sendust or nickel-iron alloy (e.g., 45/55) can be formed on the module.

With reduced-thickness ceramic or thin film closures 334, 336 or no closures on the outer modules 302, 306, the write-to-read gap spacing can be reduced to less than about 1 mm, e.g., about 0.75 mm, or 50% less than commonly-used linear tape open (LTO) tape head spacing. The open space between the modules 302, 304, 306 can still be set to approximately 0.5 to 0.6 mm, which in some approaches is ideal for stabilizing tape motion over the second module 304.

Depending on tape tension and stiffness, it may be desirable to angle the tape bearing surfaces of the outer modules relative to the tape bearing surface of the second module. FIG. 6 illustrates an embodiment where the modules 302, 304, 306 are in a tangent or nearly tangent (angled) configuration. Particularly, the tape bearing surfaces of the outer modules 302, 306 are about parallel to the tape at the desired wrap angle $\alpha_2$ of the second module 304. In other words, the planes of the tape bearing surfaces 308, 312 of the outer modules 302, 306 are oriented at about the desired wrap angle $\alpha_2$ of the tape 315 relative to the second module 304. The tape will also pop off of the trailing module 306 in this approach, thereby reducing wear on the elements in the trailing module 306. These approaches are particularly useful for write-read-write applications. Additional aspects of these approaches are similar to those given above.

Typically, the tape wrap angles may be set about midway between the embodiments shown in FIGS. 5 and 6.

Figure 7:
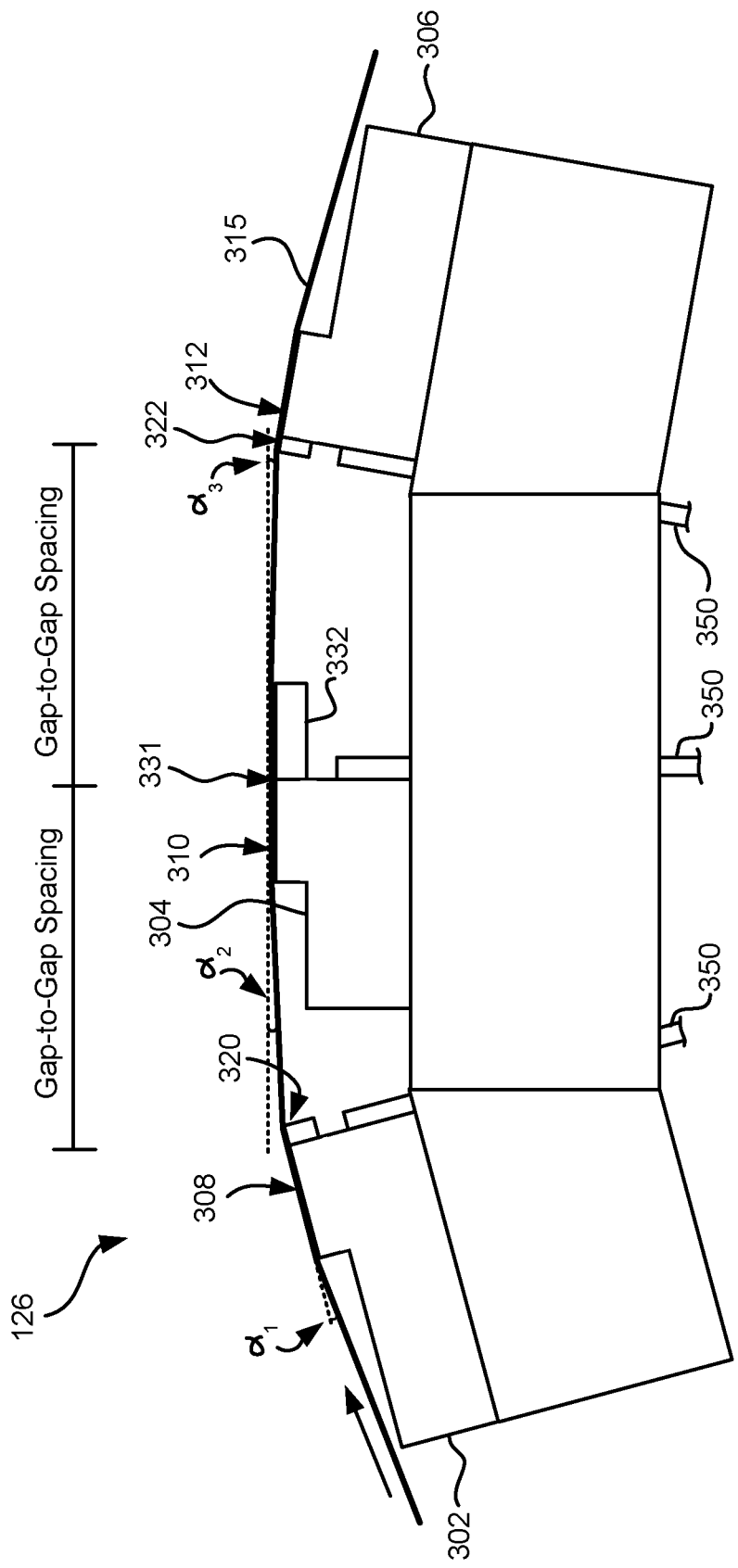
FIG. 7 is a side view of a magnetic tape head with three modules in an overwrap configuration.

FIG. 7 illustrates an embodiment where the modules 302, 304, 306 are in an overwrap configuration. Particularly, the tape bearing surfaces 308, 312 of the outer modules 302, 306 are angled slightly more than the tape 315 when set at the desired wrap angle $\alpha_2$ relative to the second module 304. In this embodiment, the tape does not pop off of the trailing module, allowing it to be used for writing or reading. Accordingly, the leading and middle modules can both perform reading and/or writing functions while the trailing module can read any just-written data. Thus, these approaches are preferred for write-read-write, read-write-read, and write-write-read applications. In the latter approaches, closures should be wider than the tape canopies for ensuring read capability. The wider closures may correspond to a wider gap-to-gap separation. Therefore, a preferred approach has a write-read-write configuration, which may use shortened closures that thus allow closer gap-to-gap separation.

Additional aspects of the embodiments shown in FIGS. 6 and 7 are similar to those given above.

A 32 channel version of a multi-module head 126 may use cables 350 having leads on the same or smaller pitch as current 16 channel piggyback LTO modules, or alternatively the connections on the module may be organ-keyboarded for a 50% reduction in cable span. Over-under, writing pair unshielded cables may be used for the writers, which may have integrated servo readers.

The outer wrap angles $\alpha_1$ may be set in the drive, such as by guides of any type known in the art, such as adjustable rollers, slides, etc. or alternatively by outriggers, which are integral to the head. For example, rollers having an offset axis may be used to set the wrap angles. The offset axis creates an orbital arc of rotation, allowing precise alignment of the wrap angle $\alpha_1$.

To assemble any of the approaches described above, conventional u-beam assembly can be used. Accordingly, the mass of the resultant head may be maintained or even reduced relative to heads of previous generations. In other approaches, the modules may be constructed as a unitary body. Those skilled in the art, armed with the present teachings, will appreciate that other known methods of manufacturing such heads may be adapted for use in constructing such heads. Moreover, unless otherwise specified, processes and materials of types known in the art may be adapted for use in various approaches in conformance with the teachings herein, as would become apparent to one skilled in the art upon reading the present disclosure.

Figure 8A:
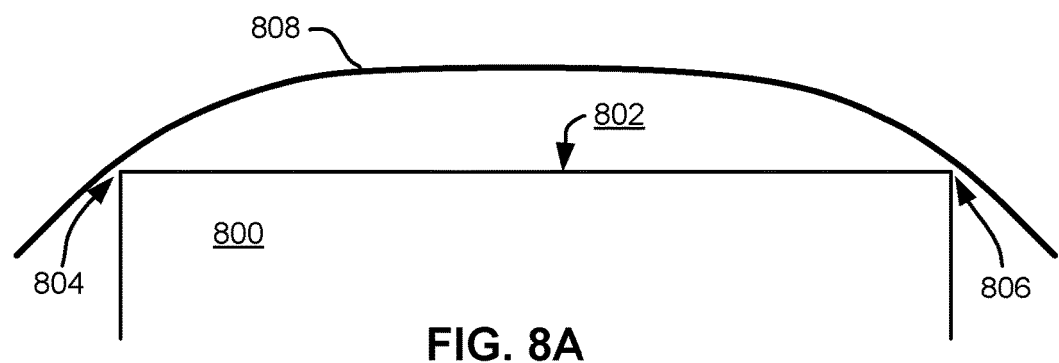
FIGS. 8A-8C are schematics depicting the principles of tape tenting.
Figure 8B:
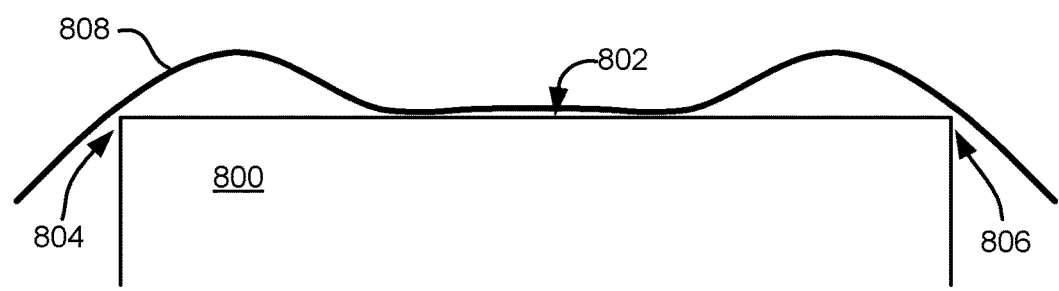
Figure 8C:
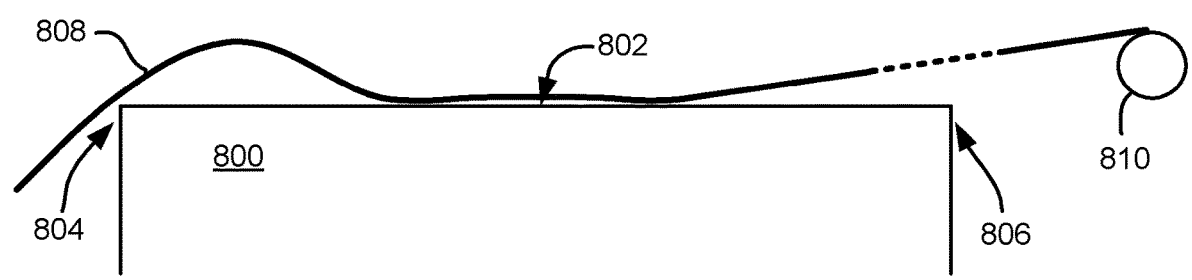

As a tape is run over a module, it is preferred that the tape passes sufficiently close to magnetic transducers on the module such that reading and/or writing is efficiently performed, e.g., with a low error rate. According to some approaches, tape tenting may be used to ensure the tape passes sufficiently close to the portion of the module having the magnetic transducers. To better understand this process, FIGS. 8A-8C illustrate the principles of tape tenting. FIG. 8A shows a module 800 having an upper tape bearing surface 802 extending between opposite edges 804, 806. A stationary tape 808 is shown wrapping around the edges 804, 806. As shown, the bending stiffness of the tape 808 lifts the tape off of the tape bearing surface 802. Tape tension tends to flatten the tape profile, as shown in FIG. 8A. Where tape tension is minimal, the curvature of the tape is more parabolic than shown.

FIG. 8B depicts the tape 808 in motion. The leading edge, i.e., the first edge the tape encounters when moving, may serve to skive air from the tape, thereby creating a subambient air pressure between the tape 808 and the tape bearing surface 802. In FIG. 8B, the leading edge is the left edge and the right edge is the trailing edge when the tape is moving left to right. As a result, atmospheric pressure above the tape urges the tape toward the tape bearing surface 802, thereby creating tape tenting proximate each of the edges. The tape bending stiffness resists the effect of the atmospheric pressure, thereby causing the tape tenting proximate both the leading and trailing edges. Modeling predicts that the two tents are very similar in shape.

FIG. 8C depicts how the subambient pressure urges the tape 808 toward the tape bearing surface 802 even when a trailing guide 810 is positioned above the plane of the tape bearing surface.

It follows that tape tenting may be used to direct the path of a tape as it passes over a module. As previously mentioned, tape tenting may be used to ensure the tape passes sufficiently close to the portion of the module having the magnetic transducers, preferably such that reading and/or writing is efficiently performed, e.g., with a low error rate.

Magnetic tapes may be stored in tape cartridges that are, in turn, stored at storage slots or the like inside a data storage library. The tape cartridges may be stored in the library such that they are accessible for physical retrieval. In addition to magnetic tapes and tape cartridges, data storage libraries may include data storage drives that store data to, and/or retrieve data from, the magnetic tapes. Moreover, tape libraries and the components included therein may implement a file system which enables access to tape and data stored on the tape.

File systems may be used to control how data is stored in, and retrieved from, memory. Thus, a file system may include the processes and data structures that an operating system uses to keep track of files in memory, e.g., the way the files are organized in memory. Linear Tape File System (LTFS) is an exemplary format of a file system that may be implemented in a given library in order to enables access to compliant tapes. It should be appreciated that various approaches herein can be implemented with a wide range of file system formats, including for example IBM Spectrum Archive Library Edition (LTFS LE). However, to provide a context, and solely to assist the reader, some of the approaches below may be described with reference to LTFS which is a type of file system format. This has been done by way of example only, and should not be deemed limiting on the invention defined in the claims.

A tape cartridge may be "loaded" by inserting the cartridge into the tape drive, and the tape cartridge may be "unloaded" by removing the tape cartridge from the tape drive. Once loaded in a tape drive, the tape in the cartridge may be "threaded" through the drive by physically pulling the tape (the magnetic recording portion) from the tape cartridge, and passing it above a magnetic head of a tape drive. Furthermore, the tape may be attached on a take-up reel (e.g., see 121 of FIG. 1A above) to move the tape over the magnetic head.

Once threaded in the tape drive, the tape in the cartridge may be "mounted" by reading metadata on a tape and bringing the tape into a state where the LTFS is able to use the tape as a constituent component of a file system. Moreover, in order to "unmount" a tape, metadata is preferably first written on the tape (e.g., as an index), after which the tape may be removed from the state where the LTFS is allowed to use the tape as a constituent component of a file system. Finally, to "unthread" the tape, the tape is unattached from the take-up reel and is physically placed back into the inside of a tape cartridge again. The cartridge may remain loaded in the tape drive even after the tape has been unthreaded, e.g., waiting for another read and/or write request. However, in other instances, the tape cartridge may be unloaded from the tape drive upon the tape being unthreaded, e.g., as described above.

Magnetic tape is a sequential access medium. Thus, new data is written to the tape by appending the data at the end of previously written data. It follows that when data is recorded in a tape having only one partition, metadata (e.g., allocation information) is continuously appended to an end of the previously written data as it frequently updates and is accordingly rewritten to tape. As a result, the rearmost information is read when a tape is first mounted in order to access the most recent copy of the metadata corresponding to the tape. However, this introduces a considerable amount of delay in the process of mounting a given tape.

To overcome this delay caused by single partition tape mediums, the LTFS format includes a tape that is divided into two partitions, which include an index partition and a data partition. The index partition may be configured to record metadata (meta information), e.g., such as file allocation information (Index), while the data partition may be configured to record the body of the data, e.g., the data itself.

Figure 9:
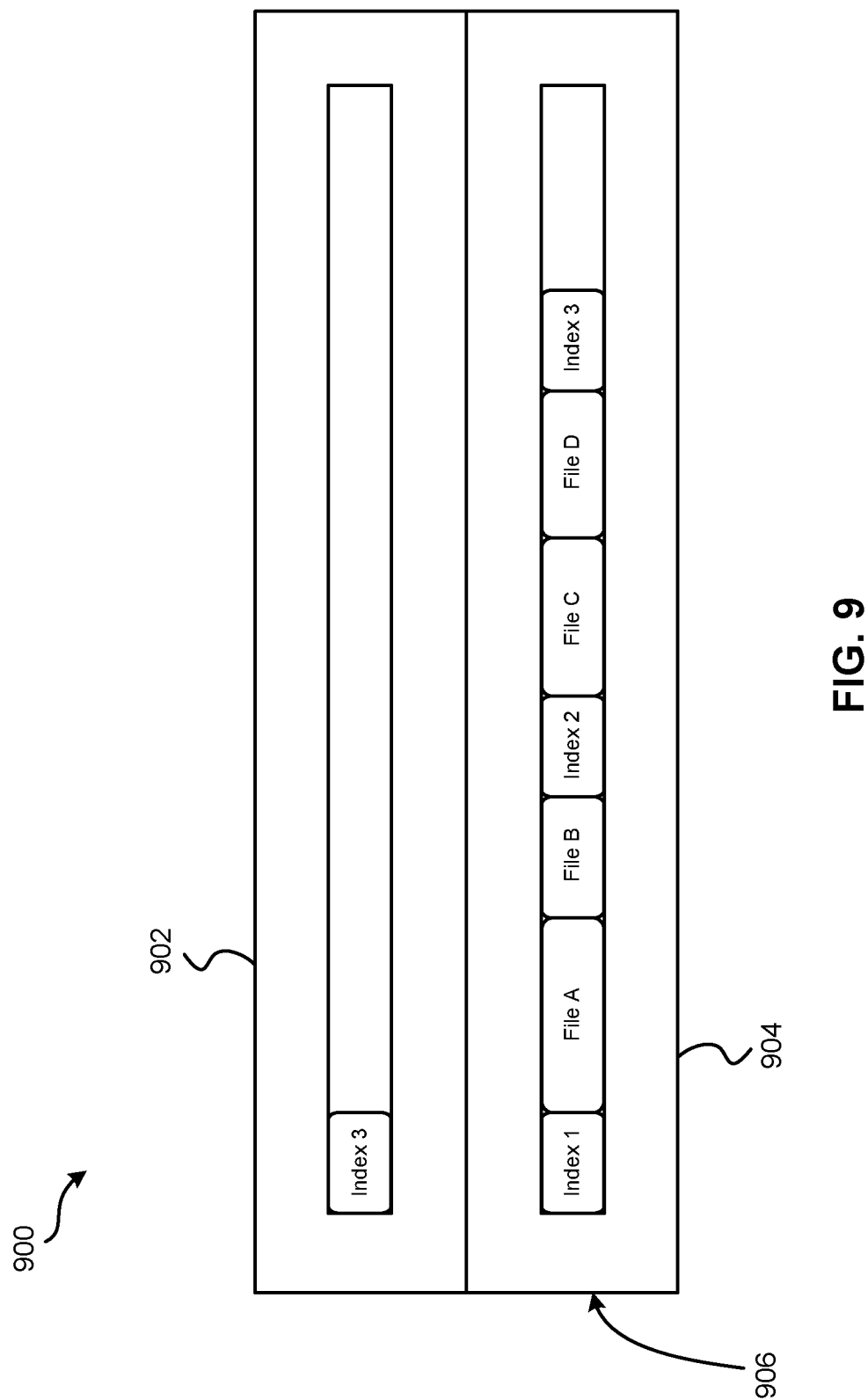
FIG. 9 is a representational diagram of files and indexes stored on a magnetic tape according to one embodiment.

Looking to FIG. 9, a magnetic tape 900 having an index partition 902 and a data partition 904 is illustrated according to one embodiment. As shown, data files and indexes are stored on the tape. The LTFS format allows for index information to be recorded in the index partition 902 at the beginning of tape 906, as would be appreciated by one skilled in the art upon reading the present description.

As index information is updated, it preferably overwrites the previous version of the index information, thereby allowing the currently updated index information to be accessible at the beginning of tape in the index partition. According to the specific example illustrated in FIG. 9, a most recent version of metadata Index 3 is recorded in the index partition 902 at the beginning of the tape 906. Conversely, all three version of metadata Index 1, Index 2, Index 3 as well as data File A, File B, File C, File D are recorded in the data partition 904 of the tape. Although Index 1 and Index 2 are old (e.g., outdated) indexes, because information is written to tape by appending it to the end of the previously written data as described above, these old indexes Index 1, Index 2 remain stored on the tape 900 in the data partition 904 without being overwritten.

The metadata may be updated in the index partition 902 and/or the data partition 904 the same or differently depending on the desired approach. According to some approaches, the metadata of the index and/or data partitions 902, 904 may be updated in response to the tape being unmounted, e.g., such that the index may be read quickly from the index partition when that tape is mounted again. The metadata is preferably also written in the data partition 904 so the tape may be mounted using the metadata recorded in the data partition 904, e.g., as a backup option.

According to one example, which is no way intended to limit the invention, LTFS LE may be used to provide the functionality of writing an index in the data partition when a user explicitly instructs the system to do so, or at a time designated by a predetermined period which may be set by the user, e.g., such that data loss in the event of sudden power stoppage can be mitigated.

As previously mentioned, track misregistration can occur when the physical dimensions of a magnetic tape change between a time that data is written to the tape and a time that the data is read back from the tape. This dimensional instability may be caused by changes in temperature, humidity, or long term creep of the media caused by stresses exerted on the magnetic tape. For instance, when a magnetic tape is not in use, it is typically wrapped onto a tape spool for storage. Due to the length of magnetic tapes, numerous wraps of the magnetic tape are layered on top of each other, extending radially outward from the center of the tape spool. This process of winding the magnetic tape onto the spool causes a compressive stress to be imposed on the magnetic tape in the radial direction. In other words, each wrap of the magnetic tape exerts a compressive stress on the layers positioned therebelow.

Tape media is a viscoelastic material having both energy storage and energy dissipative mechanisms. Thus, the compressive stress experienced by a magnetic tape while wound on a spool may cause at least a portion of the tape to widen (deform) in the cross-track direction. However, after this compressive stress is applied to a magnetic tape, at least some of the dimensional deformation experienced by the tape will not be recoverable, thereby contributing to creep. Tape creep may also be dependent on the temperature and humidity the magnetic tape is stored in, as hot and humid conditions tend to accelerate the creep process.

Figure 10:
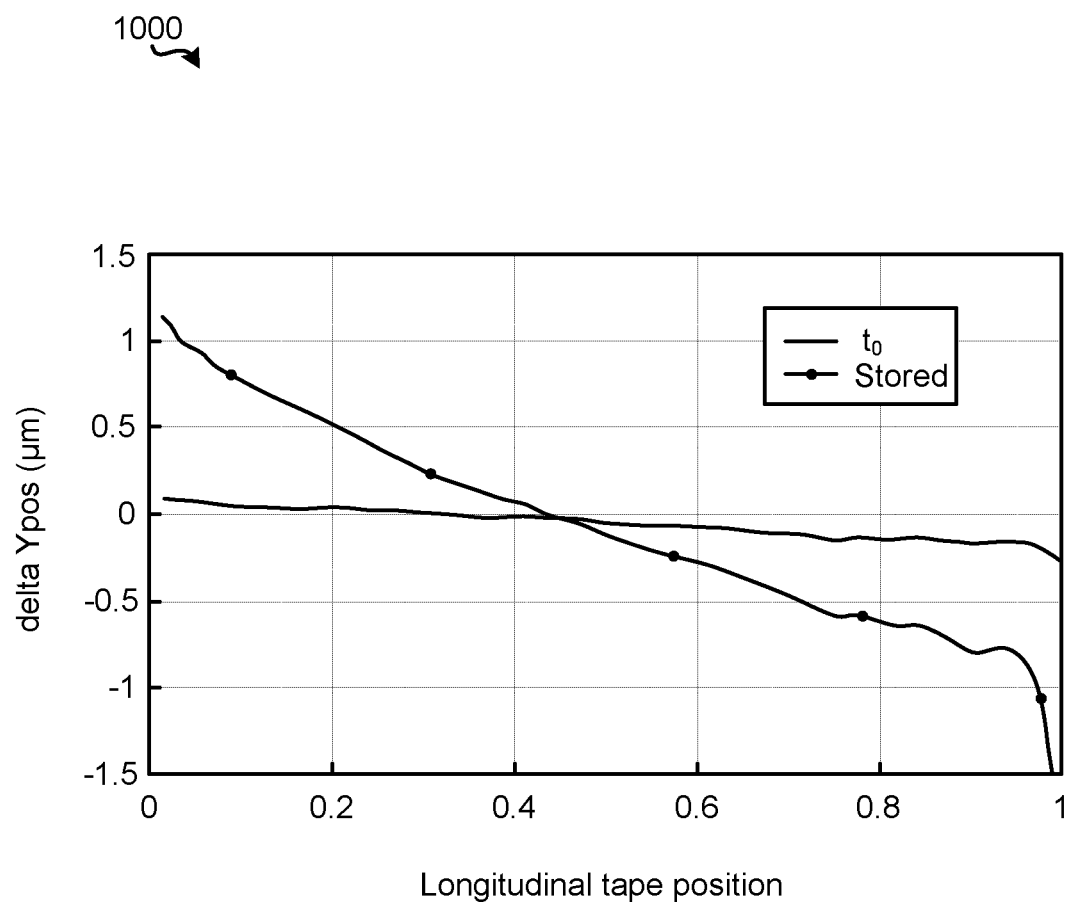
FIG. 10 is a graph of lateral magnetic tape deformation vs. longitudinal position along the length of a magnetic tape according to the prior art.

Over time, creep may be sufficient enough to cause data tracks to be misaligned compared to the position that they were written in, thereby making it difficult or even impossible to read the data stored thereon in a single pass. For instance, if the dimensions of a magnetic tape change enough, only some of the data readers can be centered on their respective previously written tracks, while the other data readers experience track misregistration. If enough of the data readers experience excessive misregistration, the data will not be able to be read successfully. Referring momentarily to FIG. 10, the graph 1000 included therein illustrates the effects of tape creep experienced by conventional products. The x-axis of graph 1000 represents the longitudinal position along the length of a magnetic tape from a beginning of tape 0 to an end of tape 1, while the y-axis represents the amount of tape contraction or expansion experienced at the given longitudinal position. Moreover, each of the plots correspond to the same magnetic tape after being wrapped on a conventional tape reel for different amounts of time. Accordingly, each of the plots included in graph 1000 illustrate a relationship between the amount of cross-track deformation experienced at a given longitudinal position of the magnetic tape, as influenced by time in storage.

As shown, the plot corresponding to the magnetic tape before it was stored on the conventional spool indicates that a negligible amount of variation in the cross-track width of the magnetic tape existed. However, after the magnetic tape was wrapped on a conventional spool and subjected to storage conditions for some time, a noticeable amount of cross-track width variation resulted. Of particular interest is the significant dimensional degradation experienced near the end of tape. As mentioned above, each wrap of the magnetic tape exerts a compressive stress on the layers positioned therebelow when wound on a tape spool. Thus, portions of the magnetic tape located closer to the end of tape experience a greater amount of compressive stress, e.g., as will be described in further detail below.

Moreover, because the magnetic tape expands in an "accordion-like" manner, adjustments to the reading position of the data readers are not able to solve this issue, as certain data readers will experience worse track misregistration if the track misregistration for others is improved. Attempts to overcome this issue have involved making the data readers themselves smaller in an attempt to ensure they stay on track. However, this also undesirably reduces reader signal output and hinders data reading.

In sharp contrast to the foregoing conventional shortcomings, various ones of the approaches included herein introduce storage schemes for magnetic tape which significantly reduce the amount of tape creep experienced. By reducing the amount of creep experienced by a magnetic tape, track misregistration may be greatly reduced. Moreover, these improvements hold true even over long periods of storage. As a result, some of the approaches included herein are able to improve read performance by reducing the bit error rate experienced while reading magnetic tape which has been stored on a tape spool, thereby also improving data access times, increasing achievable system throughput, etc., as will be described in further detail below.

Figure 11A:
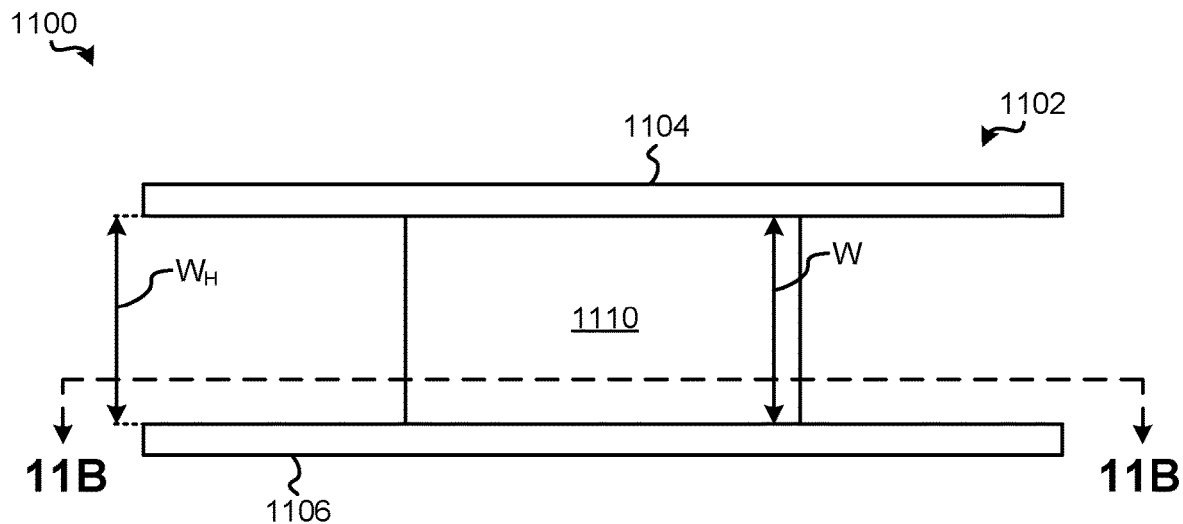
FIG. 11A is a side view of a product having a tape spool according to one embodiment.
Figure 11B:
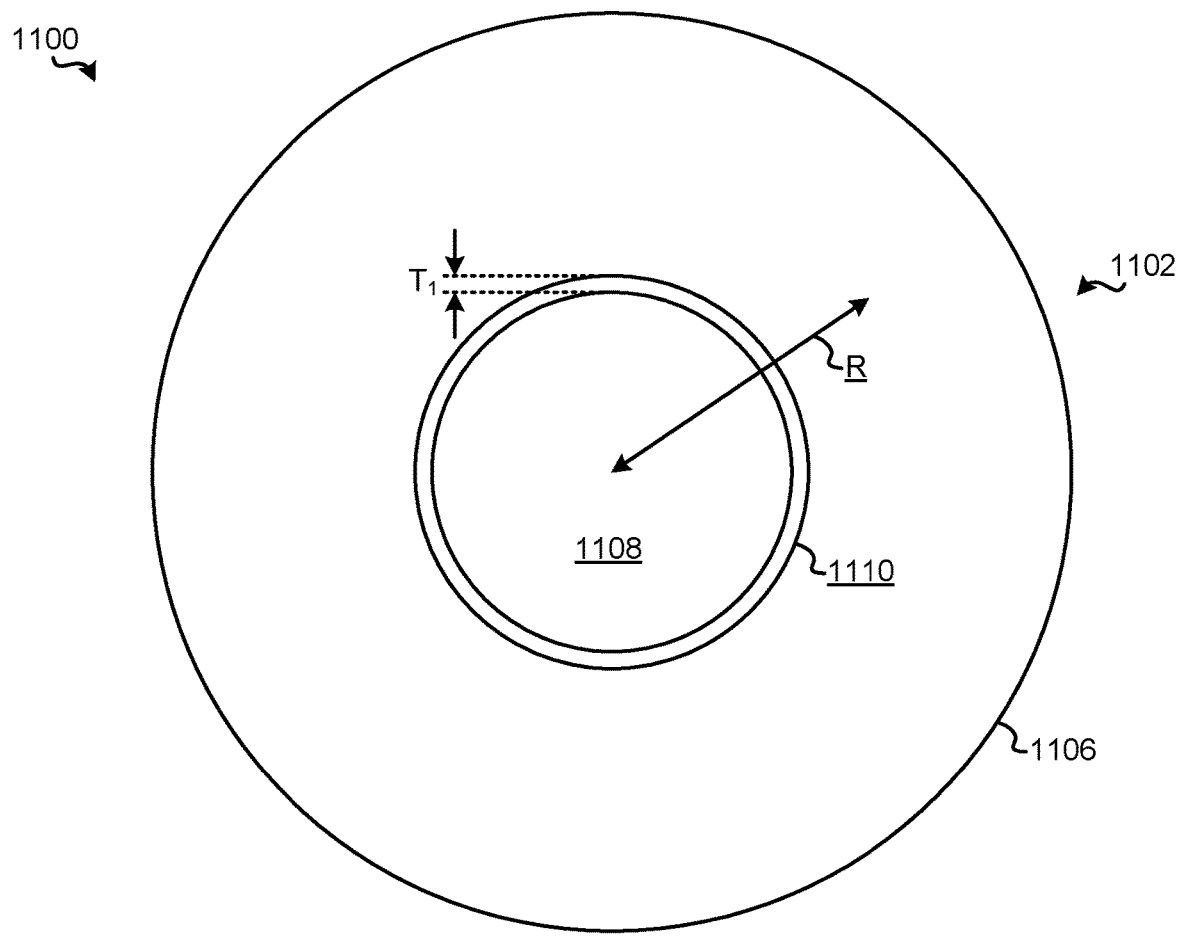
FIG. 11B is a cross-sectional top-down view of the product in FIG. 11A taken along line 11B-11B.

Looking to FIGS. 11A-11B, a product 1100 having a tape spool 1102 is illustrated in accordance with one embodiment. As an option, the present product 1100 may be implemented in conjunction with features from any other embodiment listed herein, such as those described with reference to the other FIGS., such as FIG. 1B. However, such product 1100 and others presented herein may be used in various applications and/or in permutations which may or may not be specifically described in the illustrative embodiments listed herein. Further, the product 1100 presented herein may be used in any desired environment. Thus FIGS. 11A-11B (and the other FIGS.) may be deemed to include any possible permutation.

As mentioned above, the product 1100 includes a tape spool 1102. The tape spool 1102 further includes a first flange 1104, a second flange 1106, and a circular hub 1108 sandwiched between the first and second flanges 1104, 1106. It follows that a first end of the hub 1108 may be coupled to the first flange 1104, while a second end of the hub 1108 may be coupled to the second flange 1106. Depending on the approach, the first and/or second ends of the hub 1108 may be coupled to the respective flange using adhesives, fasteners, locking grooves, threads, etc. Thus, depending on how the hub 1108 is coupled to each of the first and second flanges 1104, 1106, the hub 1108 may be selectively removable therefrom.

The first and second flanges 1104, 1106 act as guides while magnetic tape is wound onto the tape spool 1102 around the hub 1108. Thus, the first and second flanges 1104, 1106 assist in ensuring that the magnetic tape is wrapped in a uniform manner. The first and second flanges 1104, 1106 also assist in preventing any wraps from slipping or veering off the stack while being wrapped, during storage, while being transported, when being loaded into a tape drive, during use, etc. Although the tape spool 1102 is depicted as having two flanges 1104, 1106 in FIGS. 11A-11B, in other approaches a tape spool may have only one flange (e.g., see FIGS. 12A-12B below), or even no flanges, e.g., as would be appreciated by one skilled in the art after reading the present description. Thus, the first and second flanges 1104, 1106 in FIGS. 11A-11B are in no way intended to be limiting.

As mentioned above, the process of winding a magnetic tape onto the spool 1102 causes a compressive stress to be imposed on the magnetic tape towards a center of the spool 1102 along the radial direction R. Each wrap of the magnetic tape exerts a compressive stress on the layers positioned therebelow. Thus, wraps of the magnetic tape which are located radially closer to the hub 1108 experience a greater amount of compressive stress than wraps of the magnetic tape which are located radially farther from the hub 1108, e.g., at least with respect to each other. Said another way, wraps of the magnetic tape which have a greater number of wraps layered thereabove along the radial direction R experience a greater amount of compressive stress than wraps having a fewer number of wraps layered thereabove. This is evidenced by the significant dimensional degradation experienced closer to the end of tape as shown in graph 1000 above.

Once again, tape media is a viscoelastic material having both energy storage and energy dissipative mechanisms. Thus, in order to reduce the amount of radial stress exerted on the hub 1108 by a tape wound around the hub 1108, thereby also reducing the amount of radial stress exerted on inner wraps of the magnetic tape, the tape spool 1102 includes a cylindrical compliance layer 1110 which encircles the hub 1108. In other words, the compliance layer 1110 may be configured to dampen (e.g., reduce) radial stress exerted on the hub 1108 by a tape wound around the hub 1108, which in turn reduces the amount of compressive stress experienced by the various wraps of the magnetic tape as well.

In some approaches, the material composition of the compliance layer 1110 may result in the ability of the compliance layer 1110 to dampen (e.g., reduce) radial stress. For instance, the compliance layer 1110 may include one or more materials which are able to undergo elastic deformation and/or change in volume when subjected to an applied external force. In other words, the compliance layer 1110 may be able to deform in order to effectively reduce the amount of radial compressive stress imposed by the various wraps of the magnetic tape when stored on the tape spool 1102, and thereby reduce the amount of compressive stress experienced by wraps of the magnetic tape. Thus, the compliance layer 1110 may effectively serve as a cushioning (e.g., dampening) layer which surrounds the center hub 1108 of the product 1100, and which is softer, less stiff, more compliant, etc., at least in comparison to the material characteristics of the center hub 1108. The reduced amount of compressive stress experienced may also reduce the amount of tape creep experienced, particularly for portions of the magnetic tape wrapped closest to the hub 1108 (radially), even after being stored for long periods of time. Accordingly, introducing the compliance layer 1110 may significantly improve read performance, data access times, etc.

To achieve these improvements, the compliance layer 1110 may include any type of polyethylene terephthalate-polyester, rubber, vinyl, urethane, acrylic, thin foam (e.g., damping foam materials), etc., and/or combinations thereof. However, any other type of material which is able to undergo elastic deformation and/or change in volume when subjected to an applied external force may be implemented, e.g., as would be appreciated by one skilled in the art after reading the present description. Depending on the type and/or number of materials used, the compliance layer 1110 may be a single structure, a laminate structure having more than one layers, etc.

Moreover, the dimensions of the compliance layer 1110 may vary, e.g., depending on the material composition thereof. However, it is preferred that a total thickness $T_1$ of the compliance layer 1110 (measured radially from a center of the compliance layer 1110) is between about 0.5 millimeters (mm) and 0 mm. It is also greatly desired that the compliance layer 1110 has a uniform and constant thickness along the circumference of the compliance layer 1110. In other words, it is preferred that the thickness $T_1$ of the compliance layer 1110 does not vary along the circumferential length of the structure, as any discontinuity in the thickness of the compliance layer 1110 itself and/or the point where the magnetic tape attaches thereto may lead to embossment which propagates from a central region of the tape reel 1102 to the outer wraps of tape stored thereon. This embossment may undesirably cause a shifted center of mass, vibrations during use in a tape drive, portions of the magnetic tape to protrude past the flanges thereby becoming exposed, etc. Thus, a uniform, constant thickness may desirably avoid any negative effects the compliance layer 1110 has on performance.

It is also preferred that the total thickness $T_1$ of the compliance layer 1110 is between about 0.5 mm and 0 mm in order to minimize the amount of magnetic tape storage space on the spool that is taken up by the compliance layer 1110. As a result, the product 1100 is able to greatly improve dimensional stability of a magnetic tape stored thereon without sacrificing storage capacity.

The width W of the compliance layer 1110 may also vary depending on the approach. However, it is also preferred that a width W of the compliance layer 1110 is at least as wide as a cross-track width of a magnetic tape which may be wrapped on the tape reel 1102 (e.g., about 0.5 inches). Accordingly, the width W of the compliance layer 1110 may be equal to a width $W_H$ of the hub as measured between the first and second flanges 1104, 1106. In other words, the compliance layer 1110 may extend from the first flange 1104 to the second flange 1106, such that the compliance layer 1110 is in contact with both of the first and second flanges 1104, 1106. According to an illustrative example, which is in no way intended to limit the invention, the compliance layer may include Permacel P941 adhesive tape having a width W of 0.5 inches, a total thickness $T_1$ of 0.094 mm, and a circumferential length of 138.23 mm (length of the circumference) as wrapped around the hub, Permacel P941 adhesive tape being available from PLUSTAR, INC., having a sales address at 2650 Nova Drive, Dallas, Tex. 75229.

The compliance layer 1110 may be applied to the hub 1108 in a number of different ways, depending on the material composition of the compliance layer 1110, how the magnetic tape is first wrapped onto the tape spool 1102, how the compliance layer 1110 is formed, industry standards, user/manufacturer input, etc. For instance, according to some approaches, an inner surface of the compliance layer 1110 may be directly coupled to an outer surface of the hub 1108, such that no materials, layers, etc. exist between immediately adjacent surfaces of the compliance layer 1110 and the hub 1108. It follows that an inner surface of the compliance layer 1110 may be directly coupled to the outer surface of the hub 1108 by friction. In other approaches, the compliance layer 1110 may simply encircle the hub 1108 and be confined between the first and second flanges 1104, 1106.

Approaches in which the inner surface of the compliance layer 1110 is directly coupled to an outer surface of the hub 1108 may be achieved by forming the structure of the compliance layer 1110, and sliding the finished compliance layer 1110 structure over the hub 1108 before coupling the first and/or second flanges 1104, 1106 to the hub 1108. The compliance layer 1110 may also be directly coupled to an outer surface of the hub 1108 as a result of an over mold process. Thus, in some approaches the compliance layer 1110 may be formed by over molding the layer onto the hub 1108, e.g., as would be appreciated by one skilled in the art after reading the present description. The compliance layer being less stiff than the hub.

In other approaches, an inner surface of the compliance layer 1110 may be coupled to an outer surface of the hub 1108 by an adhesive material (not shown). The adhesive material may be applied to the inner surface of the compliance layer 1110 during manufacture thereof, applied to the outer surface of the hub 1108 prior to forming and/or applying the compliance layer 1110 structure thereover, applied to both the inner surface of the compliance layer 1110 and the outer surface of the hub 1108, etc. Moreover, the adhesive material may be any type of adhesive which would be apparent to one skilled in the art after reading the present description.

A second adhesive material may also be present on an outer surface of the compliance layer 1110. The second adhesive material may desirably allow for a magnetic tape to be more securely coupled to the spool 1102, thereby reducing the risk of the magnetic tape becoming detached during use, e.g., in a tape drive. The second adhesive material may be applied according to any known processes, and may be a same, similar, or different adhesive material than an adhesive material present on an inner surface of the compliance layer 1110. However, in yet other approaches, an adhesive material may only be present on an outer surface (and not an inner surface) of the compliance layer 1110.

In some approaches, the compliance layer 1110 may be a piece (e.g., strip) of material which is wrapped onto the hub 1108. Accordingly, an adhesive material applied to the inner surface of the compliance layer 1110 and/or an outer surface of the hub 1108 may allow for the compliance layer 1110 to be securely coupled to the outer surface of the hub 1108 as the compliance layer 1110 is wrapped thereon. However, the compliance layer 1110 may be coupled to the outer surface of the hub 1108 upon being wrapped thereon as a result of implementing any coupling process which would be apparent to one skilled in the art after reading the present description.

Figure 11C:
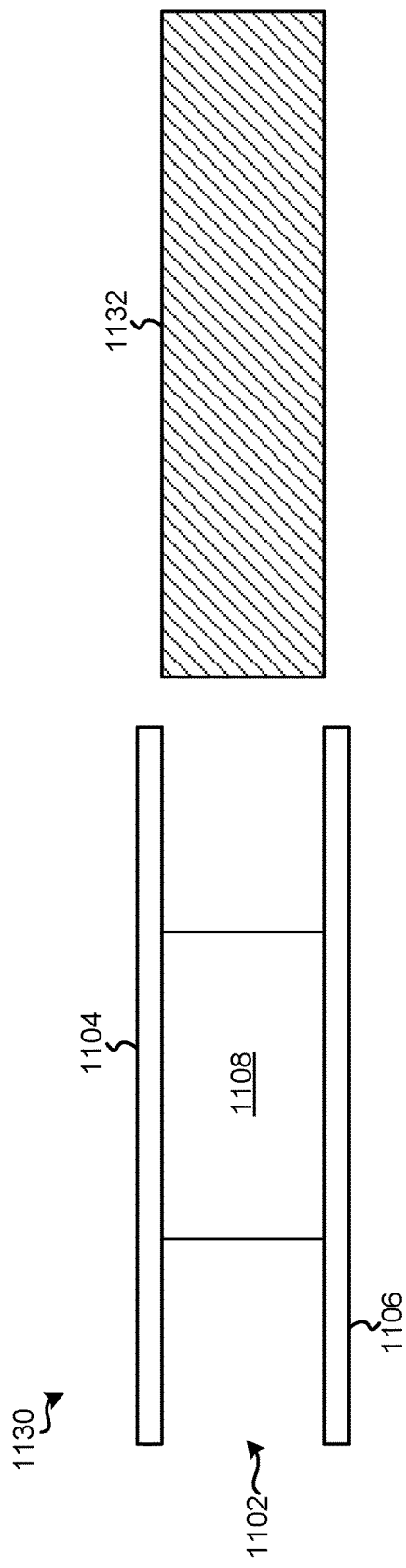
FIGS. 11C-11D are side views of a product having a tape spool according to one embodiment.
Figure 11D:
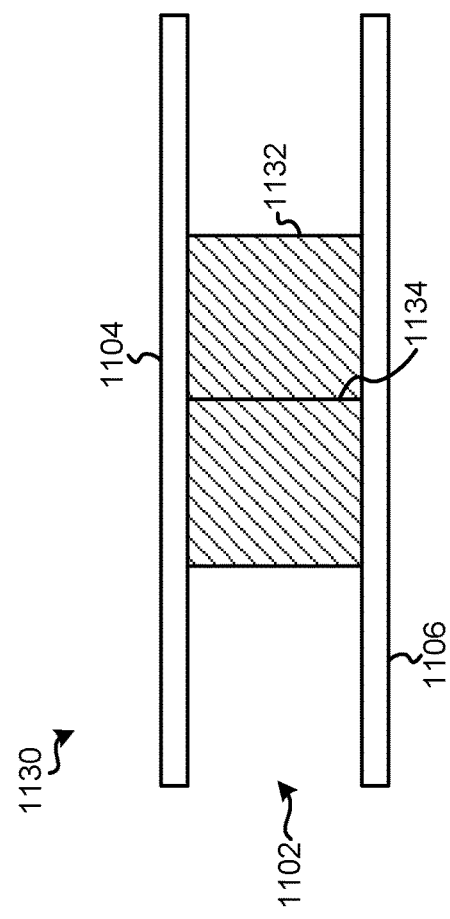

Referring momentarily to FIGS. 11C-11D, a product 1130 having a tape reel 1102 is illustrated in accordance with one embodiment. As an option, the present product 1130 may be implemented in conjunction with features from any other embodiment listed herein, such as those described with reference to the other FIGS., such as FIGS. HA-11B. Accordingly, some of the components in FIGS. 11C-11D have common numbering with those of FIGS. 11A-11B.

As shown in FIG. 11C, the compliance layer 1132 is a piece (e.g., strip) of material which may be wrapped onto the hub 1108. As mentioned above, one or more adhesive layers may be applied to (present on) one or more surfaces of the compliance layer 1132, the hub 1108, etc. in order to couple the various components together.

Moreover, it is preferred that the compliance layer 1132 does not wrap back onto itself. In other words, it is preferred that a longitudinal length of the compliance layer 1132 is equal to a circumference of an outer surface of the hub 1108. Accordingly, ends of the compliance layer 1132 along a longitudinal axis thereof may abut each other at a junction 1134 when wrapped onto the hub 1108, e.g., as shown in FIG. 11D. As mentioned above, any discontinuity in the compliance layer 1132 itself and/or the point where the magnetic tape attaches thereto may lead to embossment which propagates from a central region of the tape reel 1102 to the outer wraps of tape stored thereon. This embossment may undesirably cause a shifted center of mass, vibrations during use in a tape drive, portions of the magnetic tape to protrude past the flanges thereby becoming exposed, etc.

In some approaches, a magnetic tape may be wrapped onto the hub 1108 over the compliance layer 1132. However, in other approaches in which the compliance layer 1132 is wrapped onto the hub 1108, an end of a magnetic tape may be coupled (e.g., spliced) to an end of the compliance layer 1132, e.g., such that the compliance layer 1132 and the magnetic tape may be wrapped onto the hub 1108 together.

Figure 11E:
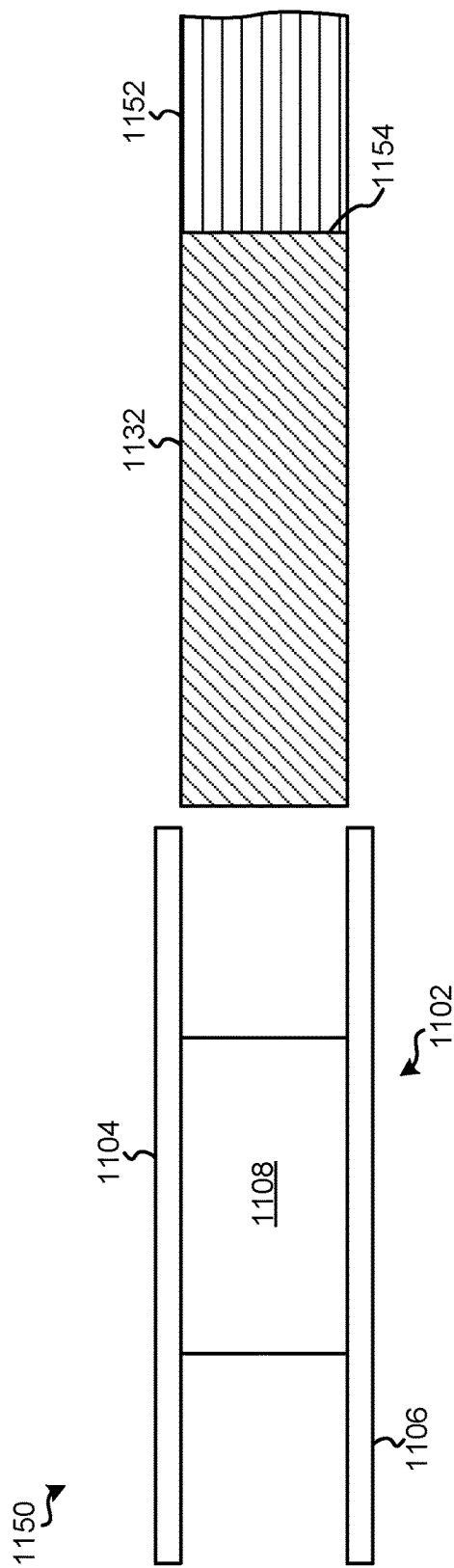
FIGS. 11E-11F are side views of a product having a tape spool according to one embodiment.
Figure 11F:
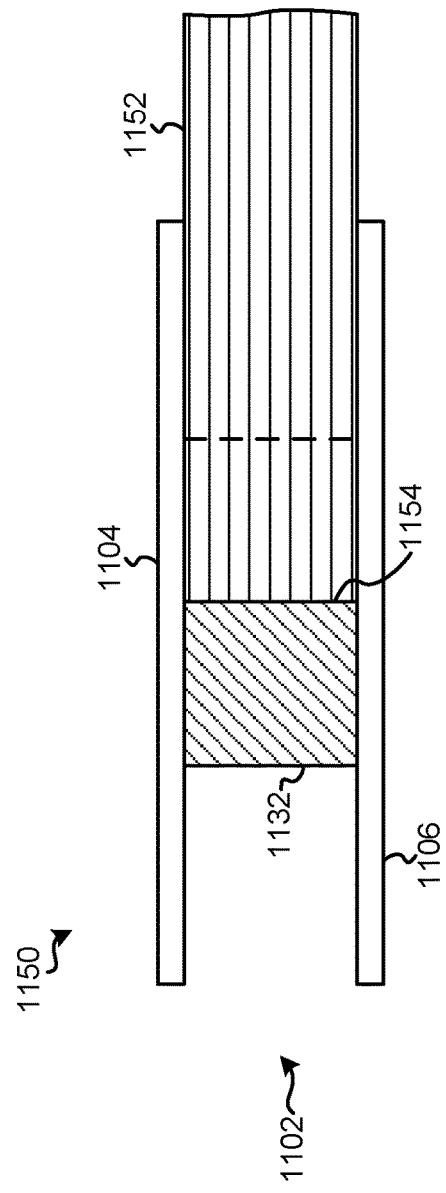

For instance, FIGS. 11E-11F, a product 1150 having a tape reel 1102 is illustrated in accordance with one embodiment. As an option, the present product 1150 may be implemented in conjunction with features from any other embodiment listed herein, such as those described with reference to the other FIGS., such as FIGS. 11A-11D. Accordingly, some of the components in FIGS. 11E-11F have common numbering with those of FIGS. 11A-11D.

As shown, an end of the compliance layer 1132 is coupled to an end of a magnetic tape 1152 at an intersection 1154 existing therebetween. Depending on the approach, the end edge of the compliance layer 1132 may be coupled to the end edge of the magnetic tape 1152, an end portion of the magnetic tape 1152 may be inserted into a portion of the end of the compliance layer 1132, an end portion of the magnetic tape 1152 may overlap with an end portion of the compliance layer 1132, etc. Moreover, the end of the compliance layer 1132 may be coupled to the end of the magnetic tape 1152 using one or more adhesive materials, friction, etc. Moreover, the magnetic tape 1152 may be of any desired type, have any desired formatting, may include any desired data stored thereon, etc. However, in some approaches the magnetic tape 1152 may be formatted according to an LTO format.

Again, it is preferred that the compliance layer 1132 does not wrap back onto itself. In other words, it is preferred that a longitudinal length of the compliance layer 1132 is equal to a circumference of an outer surface of the hub 1108. Accordingly, ends of the compliance layer 1132 along a longitudinal axis thereof may abut each other at a junction when wrapped onto the hub 1108, thereby providing a smooth surface for the magnetic tape 1152 to be wrapped onto. However, it should be noted that the junction between opposite ends of the compliance layer 1132 is not visible in the view shown in FIG. 11F, as it is positioned behind (underneath) the intersection 1154 of an end of the compliance layer 1132 and the end of the magnetic tape 1152.

Figure 11G:
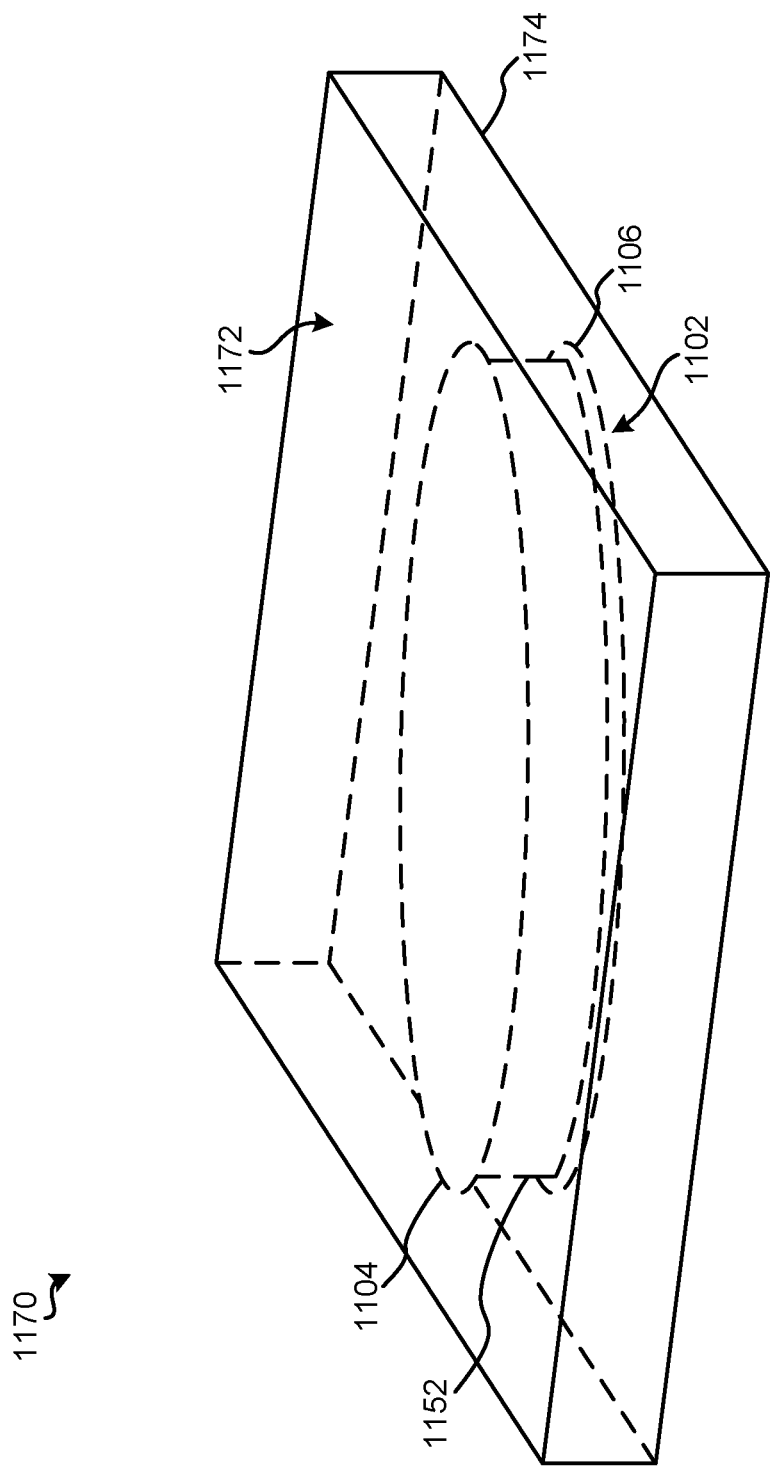
FIG. 11G is a perspective view of a product having a tape cartridge according to one embodiment.

Although the products 1100, 1130 included in FIGS. 11A-11D only depict a tape spool 1102 and magnetic tape 1152 wrapped thereon, it should be noted that one or both of the products 1100, 1130 may include additional components in other embodiments. For instance, in some approaches a product may include a tape cartridge (e.g., see 150 in FIG. 1B), and a tape spool which is positioned within an outer housing of the tape cartridge. According to an example, which is in no way intended to limit the invention, FIG. 11G illustrates a product 1170 having a tape cartridge 1172, in accordance with one embodiment. As an option, the present product 1170 may be implemented in conjunction with features from any other embodiment listed herein, such as those described with reference to the other FIGS., such as FIGS. 11A-11F. Accordingly, some of the components in FIG. 11G have common numbering with those of FIGS. 11A-11F.

However, such product 1170 and others presented herein may be used in various applications and/or in permutations which may or may not be specifically described in the illustrative embodiments listed herein. Further, the product 1170 presented herein may be used in any desired environment. Thus FIG. 11G (and the other FIGS.) may be deemed to include any possible permutation.

As shown, product 1170 includes a tape cartridge 1172 which has an outer housing 1174. In some approaches, the outer housing 1174 may have a form factor which corresponds to an LTO format (e.g., standard). The outer housing 1174 also defines an inner compartment within the tape cartridge 1172 which may be used to store various magnetic tape-based components (e.g., see cartridge memory 156 of FIG. 1B above). Accordingly, a tape spool 1102 having a magnetic tape 1152 wrapped thereon is positioned within the outer housing 1174. The tape spool and/or the components coupled thereto (e.g., such as a compliance layer and a magnetic tape) may incorporate any of the approaches described above.

Figure 12A:
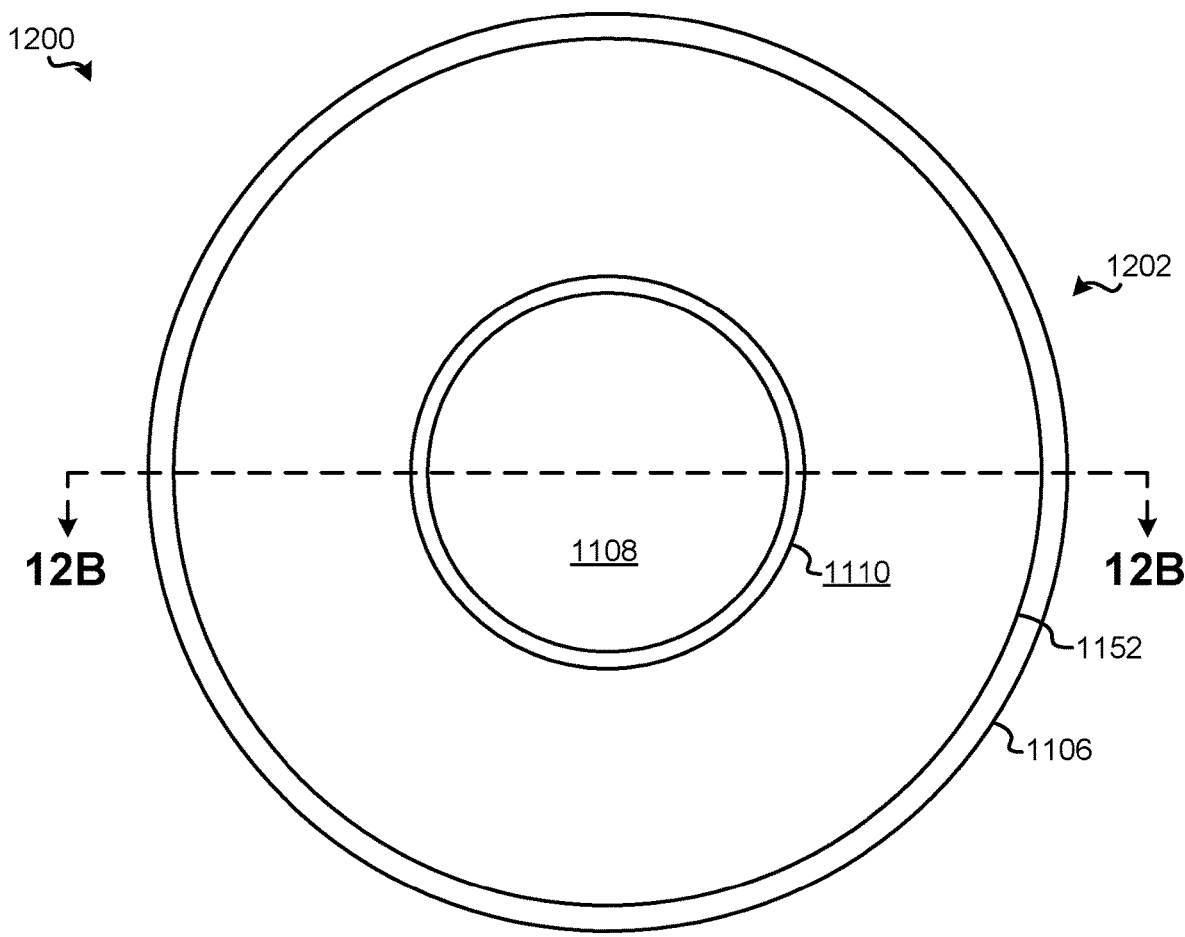
FIG. 12A is a top-down view of a product having a tape spool according to one embodiment.
Figure 12B:
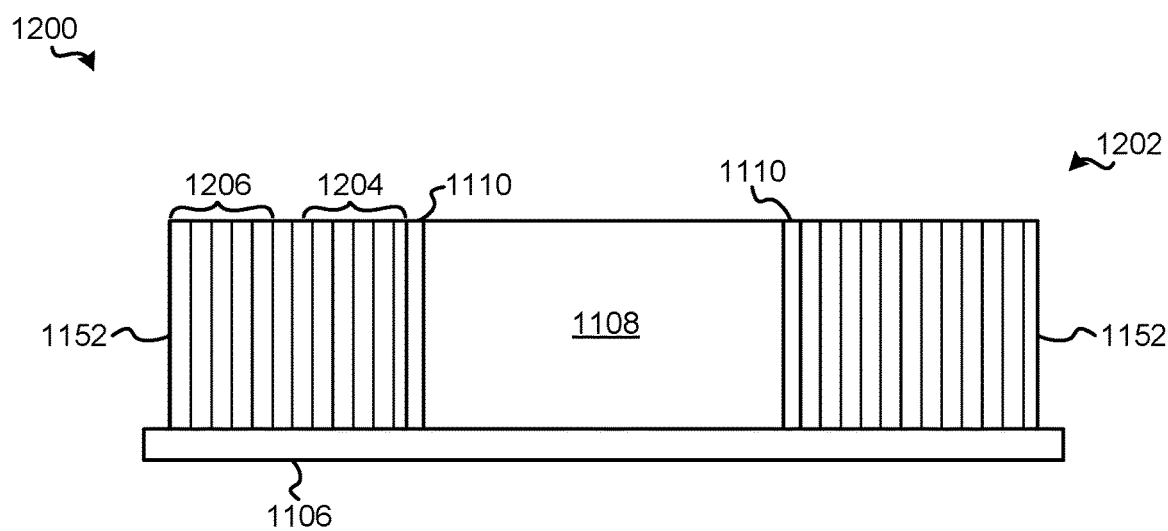
FIG. 12B is a cross-sectional side view of the product in FIG. 12A taken along line 12B-12B.

Although the approaches illustrated in FIGS. 11A-11G depict a tape spool 1102 having two flanges, a tape spool may only have one, or even no flanges in other approaches. According to an example, which is in no way intended to limit the invention, FIGS. 12A-12B illustrates a product 1200 having a tape spool 1202 with only one of the flanges 1106, in accordance with one embodiment. As an option, the present product 1200 may be implemented in conjunction with features from any other embodiment listed herein, such as those described with reference to the other FIGS., such as FIGS. HA-11G. Accordingly, some of the components in FIGS. 12A-12B have common numbering with those of FIGS. 11A-11G.

As mentioned above, the product 1200 includes a tape spool 1202 which only has one of the flanges 1106. Although the tape spool 1202 only includes one flange 1106, it may still be able to store magnetic tape which is wrapped onto the compliance layer 1110. In some approaches, the tape spool 1202 may be oriented during use, while in storage, during transport, etc. such that the one flange 1106 is positioned beneath a remainder of the product 1200. This may prevent any wraps of the magnetic tape 1152 from becoming loose, slipping off the spool 1202, coming into contact with a surface, etc.

The fill shown in the cross-sectional view of the magnetic tape 1152 in FIG. 12B is intended to denote the orientation of the wraps of magnetic tape 1152 wound around the compliance layer 1110 and hub 1108. However, it should be noted that the number and/or spacing between each of the fill lines are in no way intended to limit the invention, but rather have been included for representational purposes. Moreover, in an attempt to further clarify the terms used in the various approaches herein, wraps of the magnetic tape 1152 which are located "radially closer" to the compliance layer 1110 and hub 1108 have been identified (see 1204) in comparison to wraps of the magnetic tape 1152 which are located "radially farther" from the compliance layer 1110 and hub 1108 (see 1206).

It follows that various ones of the approaches included herein introduce compliance layers which are able to achieve storage structures for magnetic tape which significantly reduce the amount of tape creep experienced, even after long periods of storage. By reducing the amount of creep experienced by a magnetic tape, track misregistration may be greatly reduced, thereby improving read performance by reducing the bit error rate experienced while reading magnetic tape which has been stored on a tape spool, reducing data access times, increasing achievable system throughput, etc.

Figure 13A:
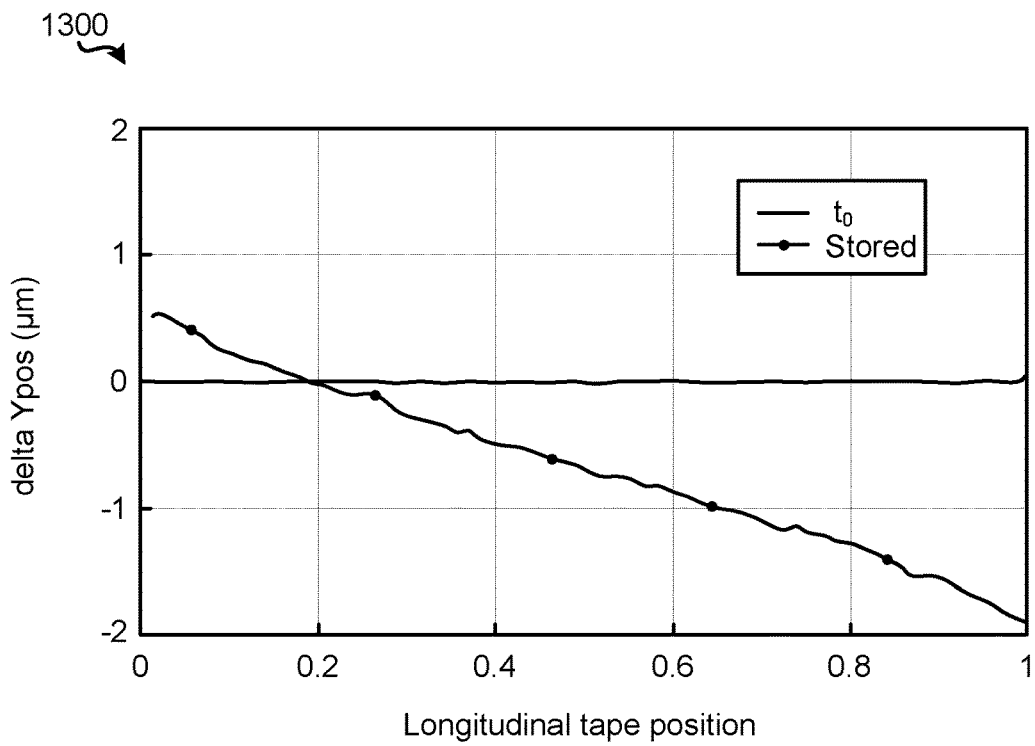
FIG. 13A is a graph of lateral magnetic tape deformation vs. longitudinal position along the length of a magnetic tape according to one embodiment.
Figure 13B:
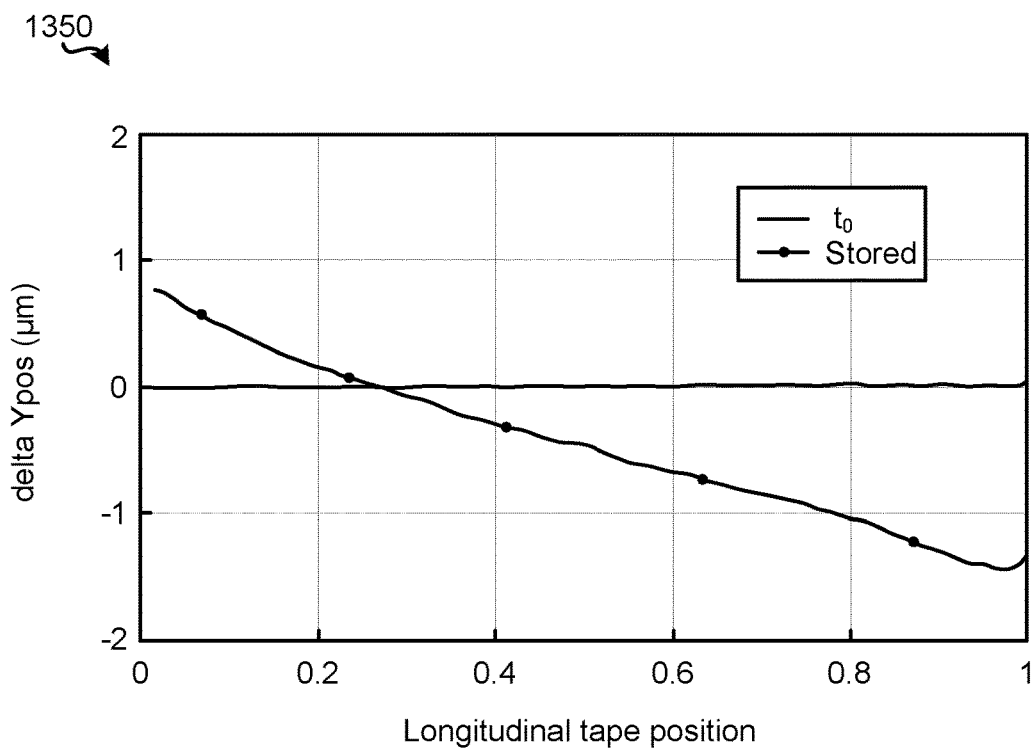
FIG. 13B is a graph of lateral magnetic tape deformation vs. longitudinal position along the length of a magnetic tape according to one embodiment.

These improvements are apparent by looking to the graphs 1300, 1350 of FIGS. 13A-13B. The data used to form the plots in graphs 1300, 1350 corresponds to experimentation performed on two in-use examples, which are in no way intended to limit the invention. Specifically, graph 1300 in FIG. 13A corresponds to an experiment conducted in which a polyethylene terephthalate-polyester compliance layer having a 0.5 inch width and a 0.1 mm thickness was wrapped around the hub of a tape reel before winding a magnetic tape on top of the compliance layer. As described above, the compliance layer provides compliance when compressive force is implemented on the media, particularly for wraps of the magnetic tape which are closer to the hub. As a result, media expansion is prevented and integrity of the data stored on the media is maintained. This improvement is represented in the plot which represents the magnetic tape after being stored for an amount of time Stored, as the delta Ypos value does not decrease significantly towards the end of tape as seen in graph 1000 of FIG. 10 above. Although the magnetic tape has experienced a somewhat linear lateral deformation pattern (apparent when comparing the plot which represents the magnetic tape before being wrapped onto the spool $t_0$ and the plot which represents post storage Stored), the level of dimensional stability experienced towards the end of tape, particularly in comparison to conventional products, provides significant improvements to achievable throughput, bit error rates, data access times, etc. as described herein.

Similar improvements are illustrated in FIG. 13B as well. Specifically, graph 1350 in FIG. 13B corresponds to an experiment conducted in which a thermoplastic highly damped vinyl compliance layer having a 0.5 inch width and a 0.38 mm thickness was wrapped around the hub of a tape reel before winding a magnetic tape on top of the compliance layer. Once again, the compliance layer provides compliance when compressive force is implemented on the media, particularly for wraps of the magnetic tape which are closer to the hub. As a result, media expansion is prevented and integrity of the data stored on the media is maintained. This improvement is represented in the plot, as the delta Ypos value does not decrease significantly towards the end of tape as seen in graph 1000 of FIG. 10 above. In fact, the Ypos value actually improved towards the end of tape, thereby further illustrating the benefits afforded by the various approaches included herein, particularly in comparison to conventional products. Although the magnetic tape has experienced a somewhat linear lateral deformation pattern (apparent when comparing the plot which represents the magnetic tape before being wrapped onto the spool to and the plot which represents post storage Stored), the level of dimensional stability experienced towards the end of tape, particularly in comparison to conventional products, provides significant improvements to achievable throughput, bit error rates, data access times, etc. as described herein.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a ROM, an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Moreover, a system according to various embodiments may include a processor and logic integrated with and/or executable by the processor, the logic being configured to perform one or more of the process steps recited herein. By integrated with, what is meant is that the processor has logic embedded therewith as hardware logic, such as an application specific integrated circuit (ASIC), a field programmable gate array (FPGA), etc. By executable by the processor, what is meant is that the logic is hardware logic; software logic such as firmware, part of an operating system, part of an application program; etc., or some combination of hardware and software logic that is accessible by the processor and configured to cause the processor to perform some functionality upon execution by the processor. Software logic may be stored on local and/or remote memory of any memory type, as known in the art. Any processor known in the art may be used, such as a software processor module and/or a hardware processor such as an ASIC, a FPGA, a central processing unit (CPU), an integrated circuit (IC), etc.

It will be clear that the various features of the foregoing systems and/or methodologies may be combined in any way, creating a plurality of combinations from the descriptions presented above.

It will be further appreciated that embodiments of the present invention may be provided in the form of a service deployed on behalf of a customer.

The inventive concepts disclosed herein have been presented by way of example to illustrate the myriad features thereof in a plurality of illustrative scenarios, embodiments, and/or implementations. It should be appreciated that the concepts generally disclosed are to be considered as modular, and may be implemented in any combination, permutation, or synthesis thereof. In addition, any modification, alteration, or equivalent of the presently disclosed features, functions, and concepts that would be appreciated by a person having ordinary skill in the art upon reading the instant descriptions should also be considered within the scope of this disclosure.

While various embodiments have been described above, it should be understood that they have been presented by way of example only, and not limitation. Thus, the breadth and scope of an embodiment of the present invention should not be limited by any of the above-described exemplary embodiments, but should be defined only in accordance with the following claims and their equivalents.

What is claimed is:

1. A product, comprising:
   a tape spool having:
      a first flange;
      a second flange;
      a circular hub sandwiched between the first and second flanges; and
      a cylindrical compliance layer which encircles the hub,
   wherein the compliance layer is configured to dampen radial stress exerted on the hub by a tape wound around the hub,
   wherein a longitudinal length of the compliance layer is equal to a circumference of the outer surface of the hub,
   wherein the compliance layer is a laminate structure having more than one layer, wherein the thickness of the compliance layer is constant along a circumference of the compliance layer,
   wherein an inner surface of the compliance layer is directly coupled to an outer surface of the hub,
   wherein an adhesive material is present on an outer surface of the compliance layer.

2. The product as recited in claim 1, wherein the thickness of the compliance layer is between 0 millimeters and 0.1 millimeters.

3. The product as recited in claim 2, wherein the compliance layer includes polyethylene terephthalate-polyester and vinyl.

4. The product as recited in claim 1, wherein the thickness of the compliance layer is 0.1 millimeters, wherein the thickness of the compliance layer is uniform.

5. The product as recited in claim 1, wherein a first of the layers in the laminate structure includes urethane.

6. The product as recited in claim 5, wherein a first end of the compliance layer is directly coupled to an end of a magnetic tape and wound onto the hub, wherein the compliance layer does not wrap back onto itself.

7. The product as recited in claim 5, wherein a width of the compliance layer is equal to a width of the hub as measured between the first and second flanges, wherein the compliance layer extends from the first flange to the second flange such that the compliance layer is in direct contact with both of the first and second flanges.

8. A product, comprising:
   a tape cartridge having:
      an outer housing;
      a tape spool positioned within the outer housing, wherein the tape spool includes:
         a first flange,
         a circular hub coupled to the first flange, and
         a cylindrical compliance layer which encircles the hub; and
      a magnetic tape wrapped around the compliance layer and the hub,
   wherein the compliance layer is configured to dampen radial stress exerted on inner wraps of the magnetic tape,
   wherein the compliance layer is directly coupled to an end of the magnetic tape and wound onto the hub, wherein the compliance layer is a laminate structure of uniform thickness, having more than one layer, wherein an inner surface of the compliance layer is directly coupled to an outer surface of the hub, wherein an adhesive material is present on an outer surface of the compliance layer,
   with a proviso that the tape spool does not have a second flange on an opposite side of the circular hub as the first flange.

9. The product as recited in claim 8, wherein the thickness of the compliance layer is less than 0.1 millimeters, wherein the thickness of the compliance layer is constant along a circumference of the compliance layer.

10. The product as recited in claim 9, wherein the compliance layer includes acrylic and a damping foam, wherein a portion of the magnetic tape is directly coupled to the outer surface of the compliance layer by the adhesive material.

11. The product as recited in claim 9, wherein the thickness of the compliance layer is uniform, wherein a first of the layers in the laminate structure includes urethane, wherein a second of the layers in the laminate structure includes a damping foam.

12. The product as recited in claim 8, wherein an inner surface of the compliance layer is coupled to an outer surface of the hub by an adhesive material, wherein a second adhesive material is present on an outer surface of the compliance layer, wherein the compliance layer does not wrap back onto itself, wherein the compliance layer is a laminate structure having more than one layer.

13. The product as recited in claim 12, wherein the thickness of the compliance layer is uniform, wherein the thickness of the compliance layer is less than 0.1 millimeters.

14. The product as recited in claim 8, wherein a width of the compliance layer is greater than or equal to a width of the magnetic tape.

15. The product as recited in claim 8, wherein the magnetic tape is formatted according to a linear tape open format, wherein the tape cartridge has a form factor which corresponds to the linear tape open format, wherein the tape cartridge has a cartridge memory positioned within the outer housing.

16. The product as recited in claim 15, wherein the compliance layer is over molded onto the hub, the compliance layer being less stiff than the hub, wherein the cartridge memory includes Flash memory.

17. A product, comprising:
   a tape spool having:
      a first flange;
      a circular hub coupled to the first flange; and
      a cylindrical compliance layer encircling the hub,
   with a proviso that the tape spool does not have a second flange on an opposite side of the circular hub as the first flange,
   wherein the compliance layer is configured to dampen radial stress exerted on the hub by a magnetic tape wound around the hub,
   wherein a longitudinal length of the compliance layer is equal to a circumference of the outer surface of the hub,
   wherein the compliance layer is a laminate structure of uniform thickness, having more than one layer,
   wherein an inner surface of the compliance layer is directly coupled to an outer surface of the hub,
   wherein an adhesive material is present on an outer surface of the compliance layer.

18. The product as recited in claim 17, wherein the compliance layer is over molded onto the hub, the compliance layer being less stiff than the hub, wherein a first of the layers in the laminate structure includes vinyl, wherein a second of the layers in the laminate structure includes a damping foam.

19. The product as recited in claim 17, wherein a thickness of the compliance layer is less than 0.1 millimeters.

20. The product as recited in claim 19, wherein the compliance layer includes vinyl and acrylic, wherein the compliance layer does not wrap back onto itself.

21. The product as recited in claim 20, wherein a first end of the compliance layer is directly coupled to an end of the magnetic tape and wound onto the hub along with the magnetic tape.

22. The product as recited in claim 17, wherein a portion of the magnetic tape is directly coupled to the outer surface of the compliance layer by the adhesive material, wherein a first of the layers in the laminate structure includes acrylic, wherein a second of the layers in the laminate structure includes a damping vinyl.

* * * * *